US011375151B2

(12) United States Patent
Uchimura et al.

(10) Patent No.: US 11,375,151 B2
(45) Date of Patent: Jun. 28, 2022

(54) INFORMATION PROCESSING APPARATUS, INFORMATION RECORDING MEDIUM, AND INFORMATION PROCESSING METHOD

(71) Applicant: SONY CORPORATION, Tokyo (JP)

(72) Inventors: Kouichi Uchimura, Kanagawa (JP); Kenjiro Ueda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/617,059

(22) PCT Filed: May 21, 2018

(86) PCT No.: PCT/JP2018/019485
§ 371 (c)(1),
(2) Date: Nov. 26, 2019

(87) PCT Pub. No.: WO2018/221293
PCT Pub. Date: Dec. 6, 2018

(65) Prior Publication Data
US 2021/0127084 A1 Apr. 29, 2021

(30) Foreign Application Priority Data
Jun. 1, 2017 (JP) .............................. JP2017-108958

(51) Int. Cl.
*H04N 5/92* (2006.01)
*H04N 5/84* (2006.01)
(Continued)

(52) U.S. Cl.
CPC ............. *H04N 5/85* (2013.01); *H04N 9/8042* (2013.01); *H04N 9/8233* (2013.01); *H04N 21/4345* (2013.01)

(58) Field of Classification Search
USPC ................ 386/330, 334, 329, 326, 353, 356
See application file for complete search history.

(56) References Cited

U.S. PATENT DOCUMENTS

2007/0109584 A1 5/2007 Motohashi et al.
2007/0230900 A1 10/2007 Toriumi
(Continued)

FOREIGN PATENT DOCUMENTS

CN 101515466 A 8/2009
CN 104255036 A 12/2014
(Continued)

OTHER PUBLICATIONS

Machine Translation of WO/2018070244, < Yamaki, Makio,(Year: 2018).*

(Continued)

*Primary Examiner* — Daquan Zhao
(74) *Attorney, Agent, or Firm* — Chip Law Group

(57) ABSTRACT

A configuration is implemented that converts MMT format data to MPEG-2 TSV format data for recording onto medium, thereby permitting copy control in compliance with the initial copy control information. MMT format data with copy control information set therein is input and converted to MPEG-2 TS format data for re-cording onto information recording medium. The copy control information recorded in the service description table (MH-SDT) stipulated by the MMT format is acquired and, in accordance with predetermined conversion rules, used to generate the copy control information for recording to the program map table (PMT) stipulated by the MPEG-2 TS. For example, the EPN and CCI values to be recorded to the PMT are determined in accordance with the conversion rules.

9 Claims, 28 Drawing Sheets

(51) Int. Cl.
*H04N 5/917* (2006.01)
*H04N 5/85* (2006.01)
*H04N 9/804* (2006.01)
*H04N 9/82* (2006.01)
*H04N 21/434* (2011.01)
*H04N 5/76* (2006.01)
*G11B 27/00* (2006.01)

(56) References Cited

U.S. PATENT DOCUMENTS

| | | | |
|---|---|---|---|
| 2007/0274690 A1 * | 11/2007 | Kikuchi | G11B 27/322 386/241 |
| 2008/0226259 A1 | 9/2008 | Umetsu | |
| 2010/0027789 A1 | 2/2010 | Tsuruga et al. | |
| 2014/0186010 A1 | 7/2014 | Guckenberger et al. | |
| 2015/0281799 A1 | 10/2015 | Lim | |
| 2016/0099026 A1 | 4/2016 | Iguchi et al. | |
| 2016/0241888 A1 | 8/2016 | Lim | |
| 2017/0134774 A1 | 5/2017 | Iguchi et al. | |
| 2018/0041795 A1 | 2/2018 | Yoshizawa et al. | |

FOREIGN PATENT DOCUMENTS

| | | | |
|---|---|---|---|
| CN | 107211184 A | | 9/2017 |
| EP | 3255895 A1 | | 12/2017 |
| JP | 2010-152999 A | | 7/2010 |
| JP | 2011-023071 A | | 2/2011 |
| JP | 2016-178468 A | | 10/2016 |
| JP | 2016-201567 | * | 10/2016 |
| WO | 2016/002127 A1 | | 1/2016 |
| WO | 2016/125654 A1 | | 8/2016 |
| WO | 2018/070244 A1 | | 4/2018 |
| WO | 2018070244 A1 | | 4/2018 |
| WO | WO 2018070244 | * | 4/2018 ............... H04N 5/92 |

OTHER PUBLICATIONS

International Search Report and Written Opinion of PCT Application No. PCT/JP2018/019485, dated Aug. 7, 2018, 09 pages of ISRWO.

Office Action for CN Patent Application No. 201880033800.X, dated Sep. 13, 2021, 1 pages of Office Action and 2 pages of English Translation.

* cited by examiner

FIG. 2

| TLV-SI | TIME INFORMATION | VIDEO | AUDIO | SUBTITLES | MMT-SI | APPLICATIONS | Content download, etc. | | | |
| --- | --- | --- | --- | --- | --- | --- | --- | --- | --- | --- |
| | NTP | HEVC | AAC | TTML | | HTML5 | File delivery method | | | |
| | | | | MMT | | | | UDP/IP | TLV | PHY |

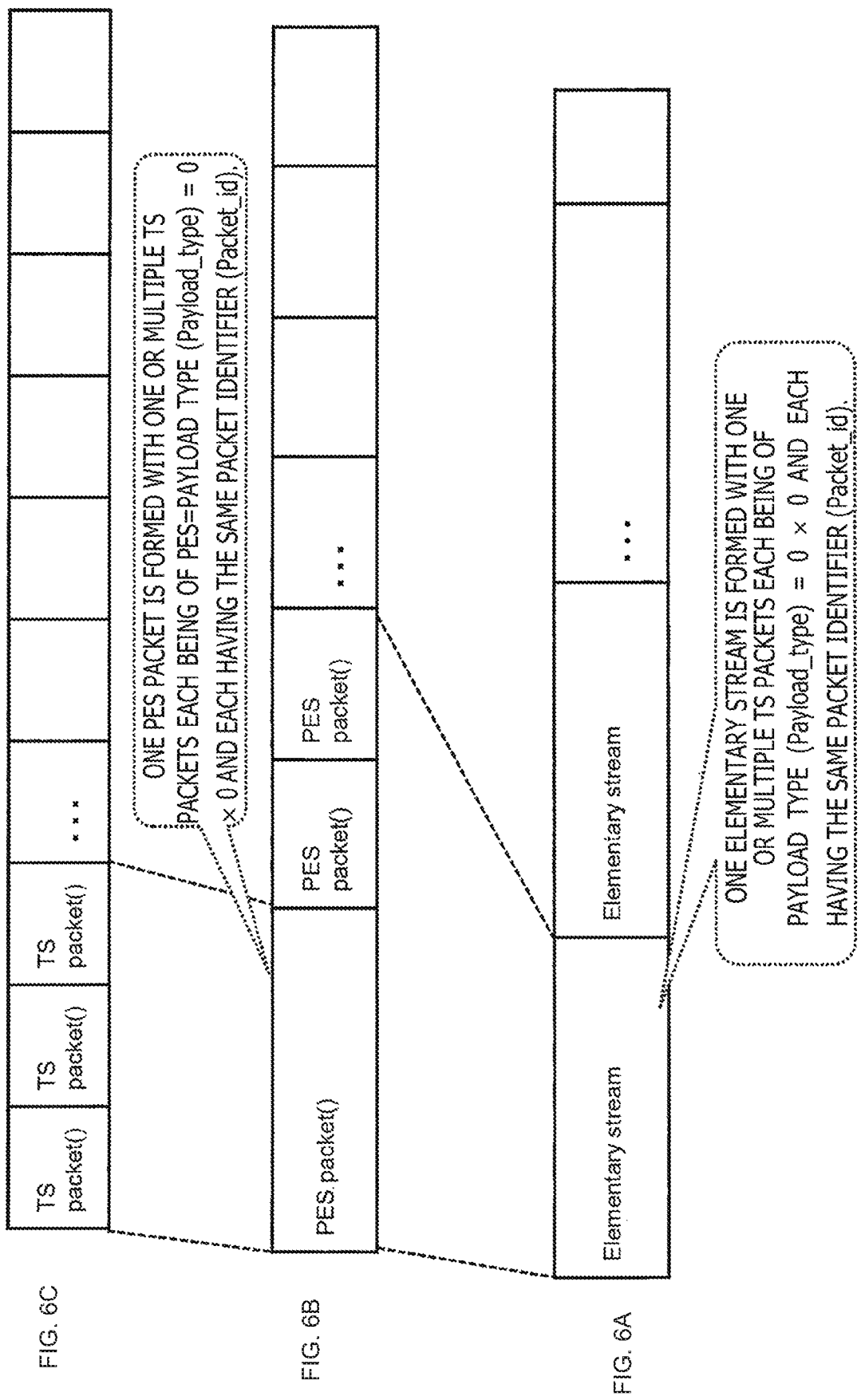

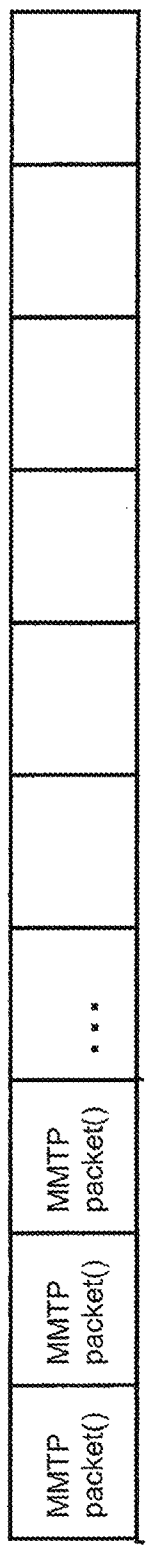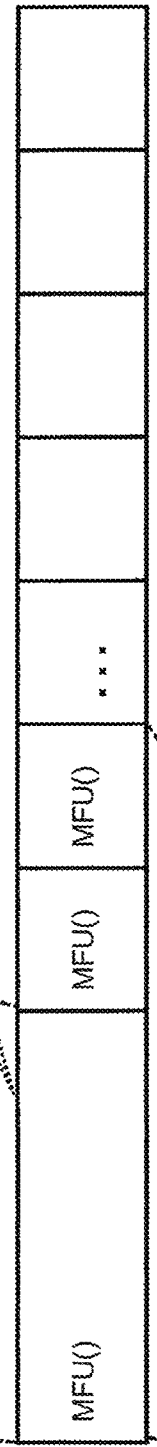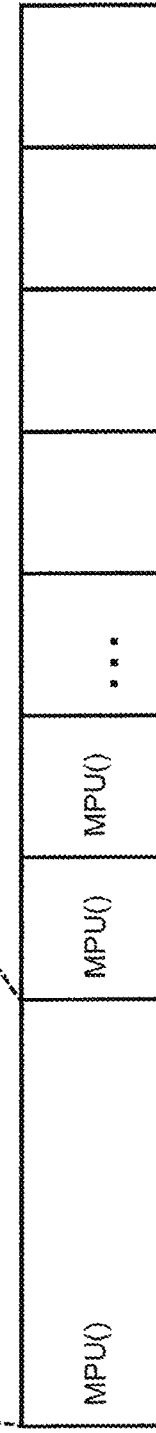
FIG. 7C
FIG. 7B
FIG. 7A

FIG. 12

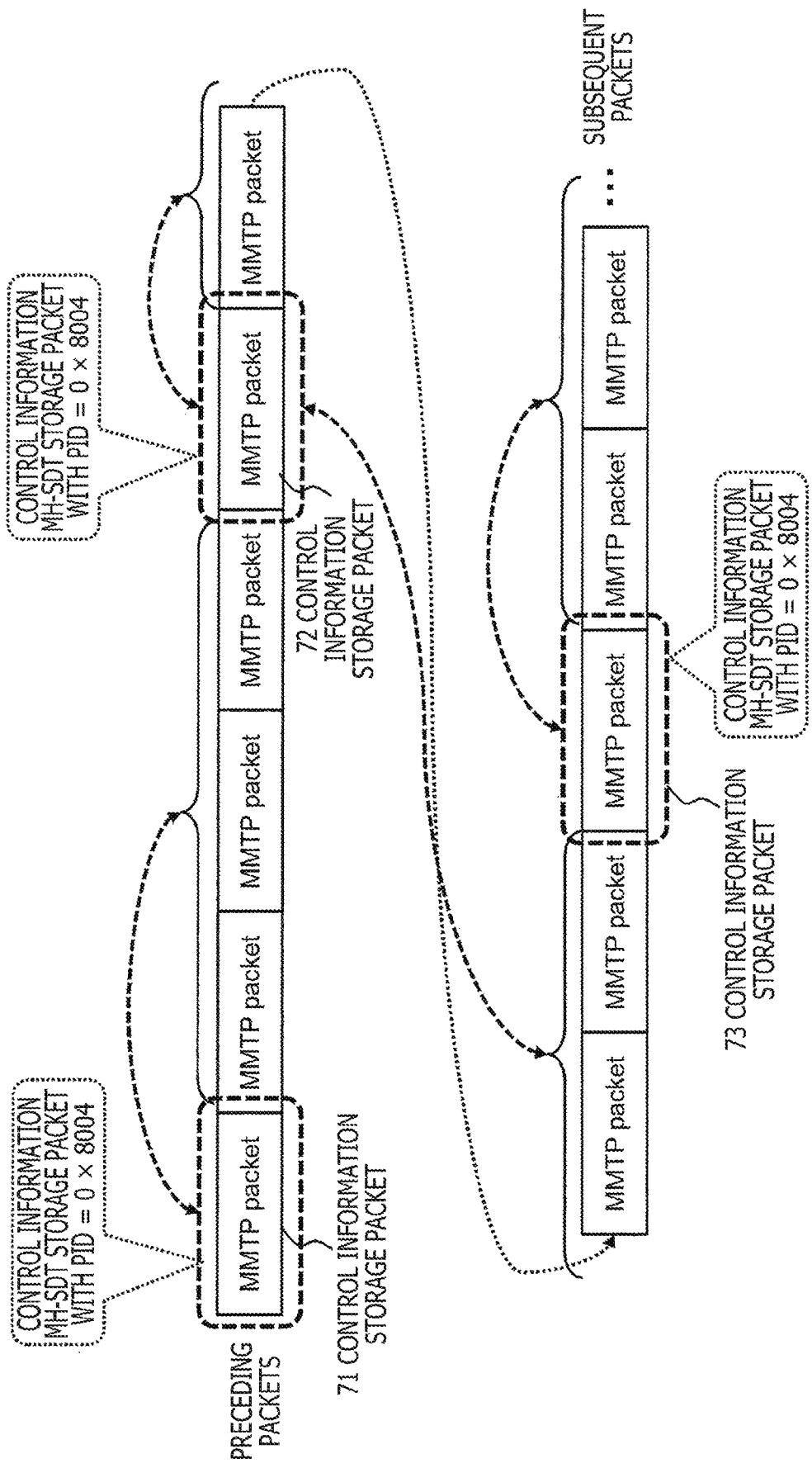

F I G. 14

| DATA CONFIGURATION (Syntax) | BIT COUNT (No. of bits) | REPRESENTATION (Mnemonic) |
|---|---|---|
| MH-Service_Description_Table (){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   tlv_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for(i=0; i<N; i++){ | | |
|     service_id | 16 | uimsbf |
|     reserved_future_use | 3 | bslbf |
|     EIT_user_defined_flags | 3 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0; j<N; j++) { | | |
|       descriptor ()   ⟵ CONTENT COPY CONTROL DESCRIPTOR / CONTENT USAGE CONTROL DESCRIPTOR | | |
|     } | | |
|   } | | |
|   CRC_32 | 32 | rpchof |
| } | | |

F I G. 15

| DATA CONFIGURATION (Syntax) | BIT COUNT (No. of bits) | REPRESENTATION (Mnemonic) |
|---|---|---|
| Content_Copy_Control_Descriptor () { | | |
|   descriptor_tag — DESCRIPTOR TAG (0 × 8004) | 16 | uimsbf |
|   descriptor_length | 8 | uimsbf |
|   digital_recording_control_data — DIGITAL RECORDING CONTROL INFORMATION | 2 | bslbf |
|   maximum_bit_rate_flag | 1 | bslbf |
|   component_control_flag — COMPONENT CONTROL FLAG (0) | 1 | bslbf |
|   reserved_future_use | 4 | bslbf |
|   reserved_future_use | 8 | bslbf |
|   if( maximum_bit_rate_flag == 1 ) | | |
|     maximum_bit_rate | 8 | uimsbf |
|   if( component_control_flag==1 ){ | | |
|     component_control_length | 8 | uimsbf |
|     for(j=0;j<N;j++){ | | |
|       component_tag | 16 | uimsbf |
|       digital_recording_control_data | 2 | bslbf |
|       maximum_bitrate_flag | 1 | bslbf |
|       reserved_future_use | 5 | bslbf |
|       reserved_future_use | 8 | bslbf |
|       if(maximum_bitrate_flag==1){ | | |
|         maximum_bitrate | 8 | uimsbf |
|       } | | |
|     } | | |
|   } | | |
| } | | |

FIG. 16

| DATA CONFIGURATION (Syntax) | BIT COUNT (No. of bits) | REPRESENTATION (Mnemonic) |
|---|---|---|
| Content_Usage_Control_Descriptor () { | | |
|   descriptor_tag | 16 | uimsbf |
|   descriptor_length | 8 | uimsbf |
|   remote_view_mode | 1 | bslbf |
|   copy_restriction_mode ——— COPY RESTRICTION MODE INFORMATION | 1 | bslbf |
|   image_constraint_token | 1 | bslbf |
|   reserved_future_use | 5 | bslbf |
|   reserved_future_use | 3 | bslbf |
|   retention_mode | 1 | bslbf |
|   retention_state | 3 | bslbf |
|   encryption_mode ——— ENCRYPTION MODE INFORMATION | 1 | bslbf |
|   for(j=0;j<Nj;j++){ | | |
|     reserved_future_use | 8 | bslbf |
|   } | | |
| } | | |

F I G. 1 7

| | DIGITAL COPY CONTROL MODES | CONTENT COPY CONTROL DESCRIPTOR | CONTENT USAGE CONTROL DESCRIPTOR | |
|---|---|---|---|---|
| | | (A) DIGITAL RECORDING CONTROL INFORMATION (digital_recording_control_data) | (B) ENCRYPTION MODE INFORMATION (encryption_mode) | (C) COPY RESTRICTION MODE INFORMATION (copy_restriction_mode) |
| (1) | COPY IS PERMITTED WITHOUT RESTRICTION, WITH COPY OUTPUT DATA REQUIRED TO BE ENCRYPTED. | 00 (COPY PERMITTED WITHOUT RESTRICTION, DIGITAL RECORDING PERMITTED) | 0 (COPY OUTPUT DATA REQUIRED TO BE ENCRYPTED) | Don't Care (NO PROVISION) |
| (2) | COPY IS PERMITTED WITHOUT RESTRICTION, WITH COPY OUTPUT DATA NOT REQUIRED TO BE ENCRYPTED. | | 1 (COPY OUTPUT DATA NOT REQUIRED TO BE ENCRYPTED) | |
| (3) | COPY PROHIBITED | 11 (COPY PROHIBITED, DIGITAL RECORDING PROHIBITED) | Don't Care (NO PROVISION) | Don't Care (NO PROVISION) |
| (4) | COPY IS PERMITTED FOR ONE GENERATION ONLY, WITH THE NUMBER OF COPIES RESTRICTED. | 10 (COPY PERMITTED FOR ONE GENERATION ONLY, DIGITAL RECORDING PERMITTED FOR ONE GENERATION ONLY) | 0 (COPY OUTPUT DATA REQUIRED TO BE ENCRYPTED) | 1 (NO. OF COPIES RESTRICTED) |
| (5) | COPY IS PERMITTED FOR ONE GENERATION ONLY, WITH THE NUMBER OF COPIES UNRESTRICTED. | | | 0 (NO. OF COPIES UNRESTRICTED) |

FIG. 18

CLIP AV STREAM FILE (MPEG-2 TS FORMAT)

| TS packet | TS packet | TS packet | TS packet | TS packet | TS packet |

PMT STORAGE FORMAT

| Syntax | No. of bits | Mnemonic |
|---|---|---|
| program_map_section () { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0;i<Ni;++) { | | |
|     descriptor() ......81 COPY STATUS DESCRIPTOR (copy_status_descriptor) | | |
|   } | | |
|   for (i = 0;i<Ni;++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (j = 0;j<Mj;++) { | | |
|       descriptor() | | |
|     } | | |
|   } | | |
|   CRC_32 | 32 | rpchof |
| } | | |

FIG.19

| DATA CONFIGURATION (Syntax) | BIT COUNT (No. of bits) |
|---|---|
| copy_status_descriptor {<br>— descriptor_tag<br>— descriptor_length<br>— CA_System_ID<br>— for ( I = 0 ; I < descriptor_length − 2 ; I++ ){<br>• private_data_byte — PRIVATE DATA BYTE<br>}<br>} | <br>8bits<br>8bits<br>16bits<br><br>8bits |

FIG. 20

| DATA CONFIGURATION (Syntax) | BIT COUNT (No. of bits) |
|---|---|
| private_data_byte { | |
| (reserved) | |
| Retention_Move_Mode | 1bit |
| Retention_State | 3bits |
| EPN (COPY OUTPUT DATA ENCRYPTION NECESSITY INFORMATION) | 1bit |
| CCI (COPY RESTRICTION INFORMATION) | 2bits |
| } | |

FIG. 21

| RECORD DATA | NO. OF BITS | | MEANING | |
|---|---|---|---|---|
| EPN (encryption plus non-assertion) | 1 | OUTPUT DATA ENCRYPTION NECESSITY INFORMATION AT TIME OF COPYING PROCESS | 0 | COPY OUTPUT DATA REQUIRED TO BE ENCRYPTED (EPN-asserted) |
| | | | 1 | COPY OUTPUT DATA NOT REQUIRED TO BE ENCRYPTED (EPN-unasserted) |
| CCI (copy control information) | 2 | COPY RESTRICTION INFORMATION | 00 | NO COPY RESTRICTION (Copy Control Not Asserted) |
| | | | 01 | NEXT-GENERATION COPY PROHIBITED (No More Copy) |
| | | | 10 | COPY OF ONE GENERATION ONLY (Copy One Generation) |
| | | | 11 | COPY PROHIBITED (Never Copy) |

FIG. 22

| | | (1) COPY CONTROL INFORMATION IN MMT FORMAT (COPY CONTROL INFORMATION RECORDED IN MH-SDT STORED IN MMTP PACKET) | | (2) COPY CONTROL INFORMATION IN MPEG-2 TS FORMAT (COPY CONTROL INFORMATION RECORDED IN PMT IN TS PACKET) | | (Note) |
|---|---|---|---|---|---|---|
| (a) COPY OUTPUT DATA ENCRYPTION NECESSITY INFORMATION (EPN CORRESPONDENCE INFORMATION) | encryption_mode | 0 | COPY OUTPUT DATA REQUIRED TO BE ENCRYPTED | EPN | 0 | COPY OUTPUT DATA REQUIRED TO BE ENCRYPTED (EPN-asserted) |
| | | 1 | COPY OUTPUT DATA NOT REQUIRED TO BE ENCRYPTED | | 1 | COPY OUTPUT DATA NOT REQUIRED TO BE ENCRYPTED (EPN-unasserted) |
| (b) AT LEAST EITHER COPY PERMISSION/PROHIBITION INFORMATION OR ALLOWED COPY COUNT INFORMATION (CCI CORRESPONDENCE INFORMATION) | digital_recording_control_data | 00 | COPY PERMITTED WITHOUT RESTRICTION | CCI | 00 | COPY UNRESTRICTED (Copy Control Not Asserted) |
| | | 11 | COPY PROHIBITED | | — | RECORDING PROHIBITED (MEDIA RECORDING PROCESS INVOLVING MPEG-2 TS FORMAT CONVERSION IS PROHIBITED.) |
| | | 10 | COPY OF ONE GENERATION ONLY | | 01 → 11 | AFTER THE COPYING PROCESS IS EXECUTED AS THE MEDIA RECORDING PROCESS INVOLVING MPEG-2 TS FORMAT CONVERSION, RECORDING IS PERFORMED WITH THE SETTING UPDATED TO "11" COPY PROHIBITED (Never Copy). | EXECUTION OF THE COPYING PROCESS REPLACES THE SETTING OF "01" NEXT-GENERATION COPY PROHIBITED (No More Copy) WITH THE SETTING OF COPY PROHIBITED (Never Copy). |

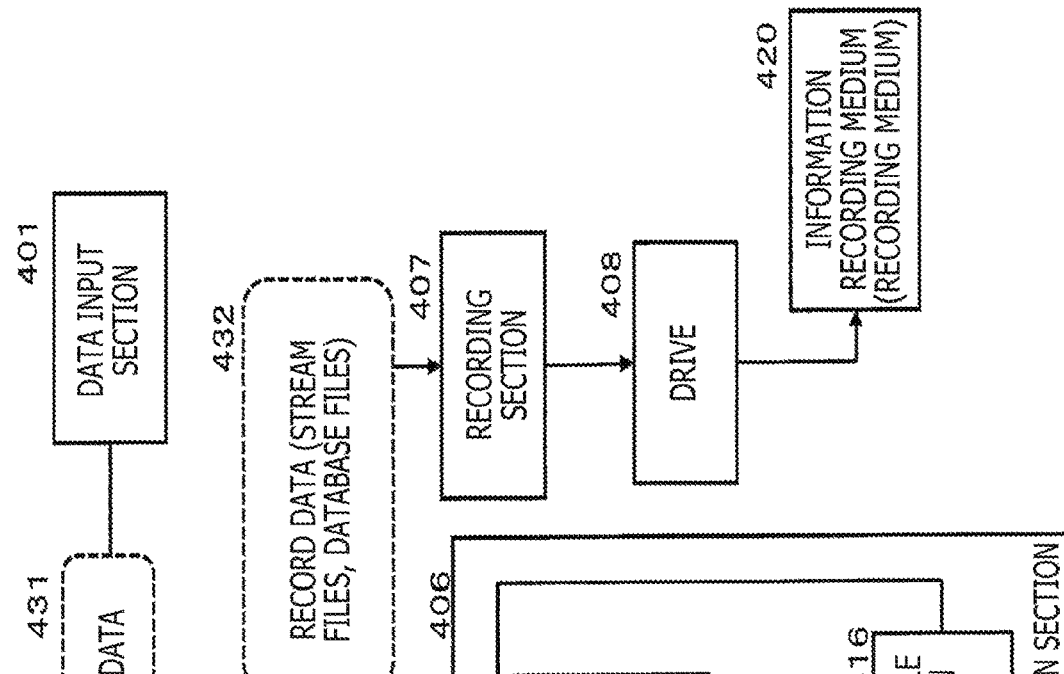
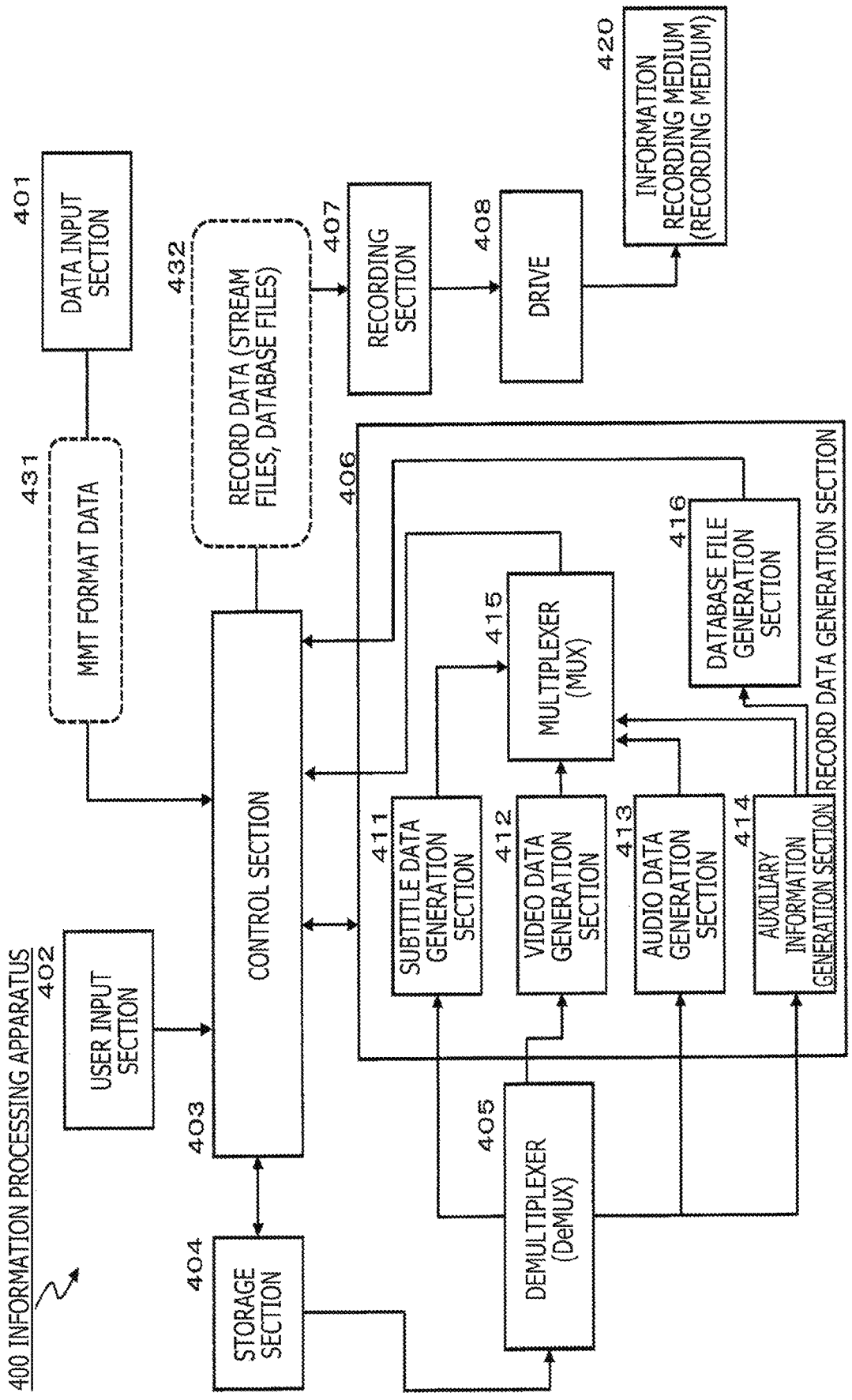
FIG. 23

FIG. 25
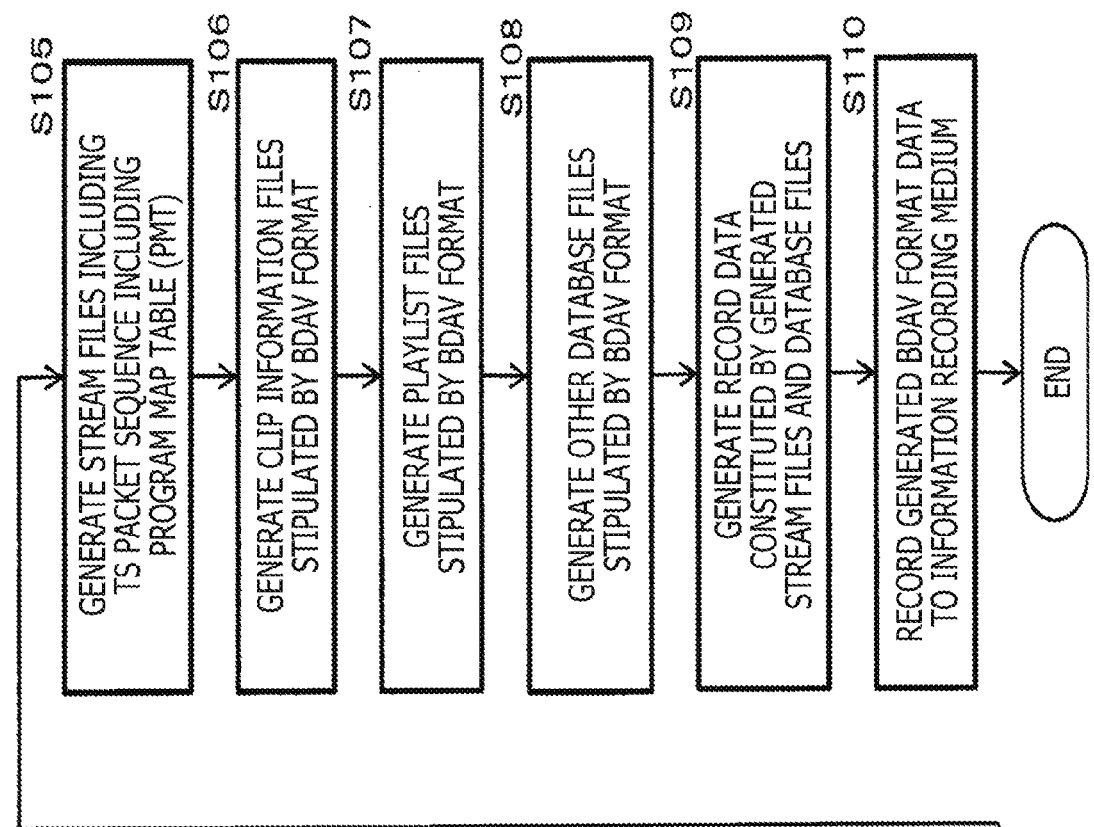
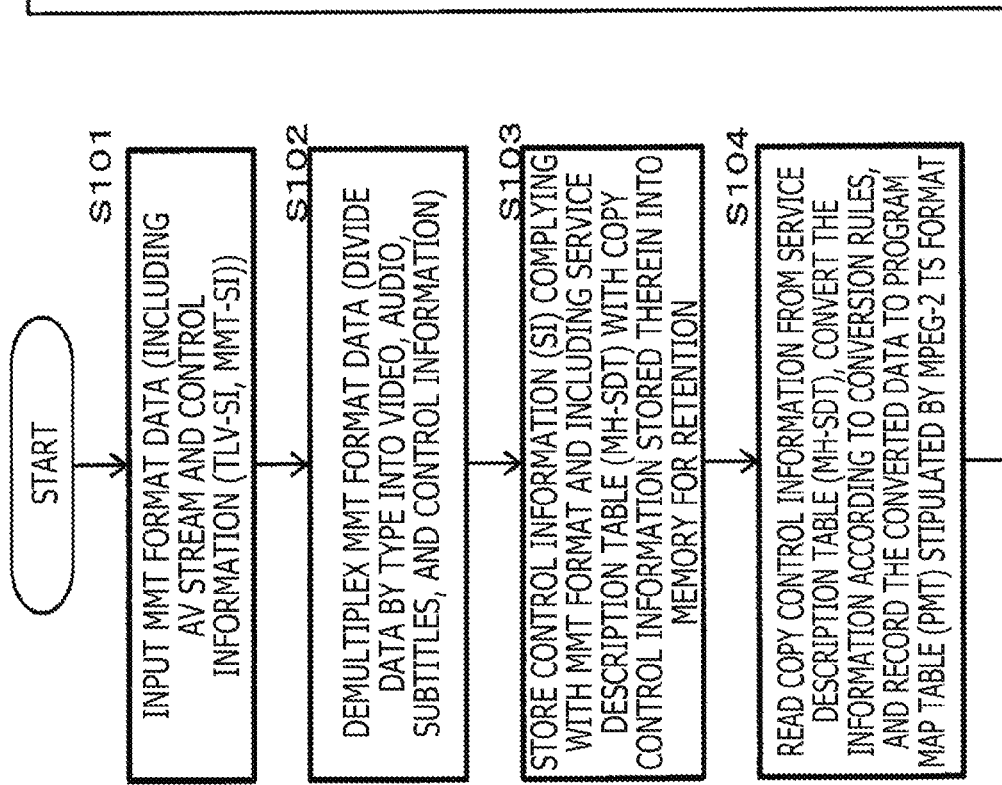

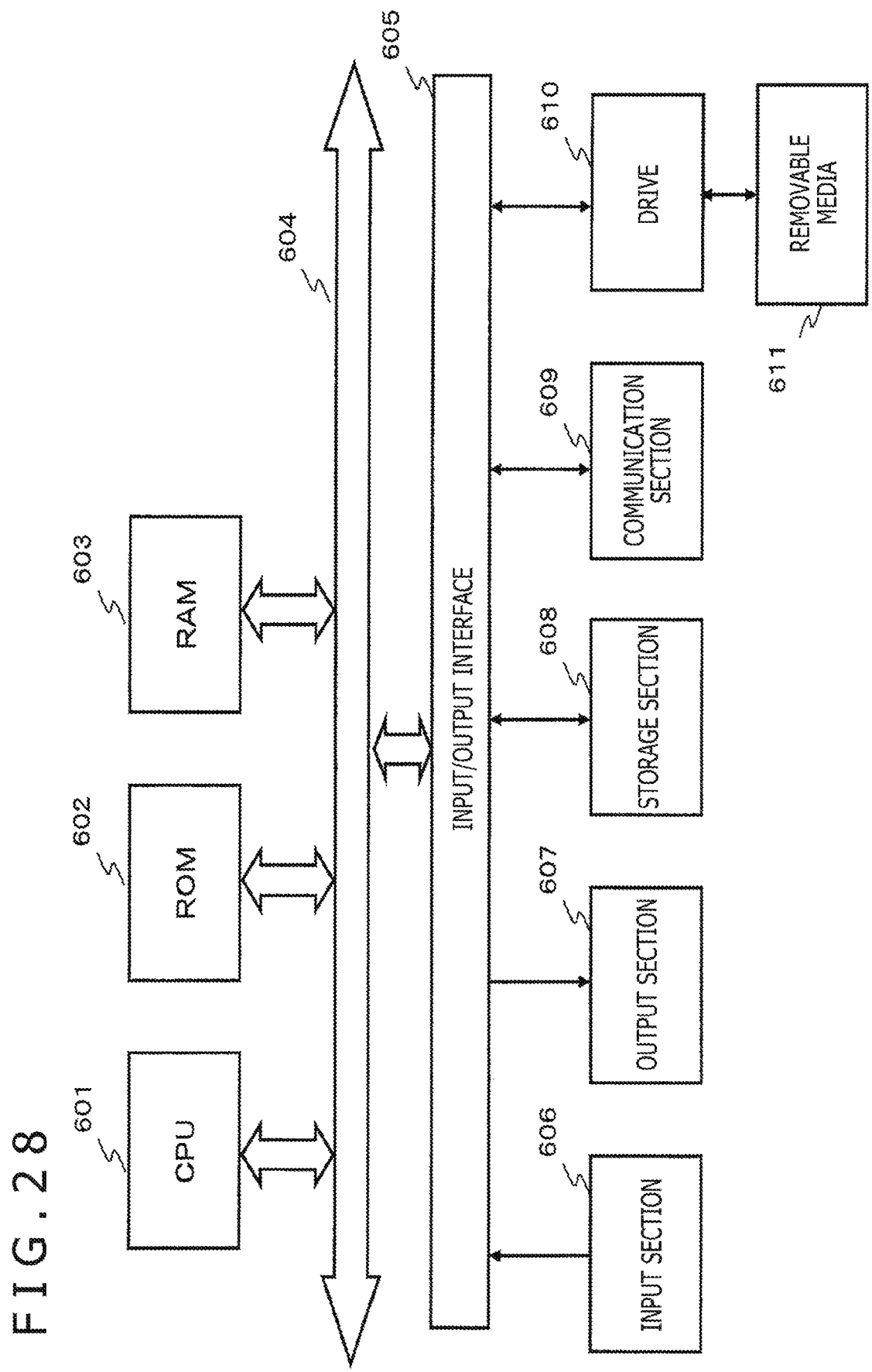

INFORMATION PROCESSING APPARATUS, INFORMATION RECORDING MEDIUM, AND INFORMATION PROCESSING METHOD

CROSS REFERENCE TO RELATED APPLICATIONS

This application is a U.S. National Phase of International Patent Application No. PCT/JP2018/019485 filed on May 21, 2018, which claims priority benefit of Japanese Patent Application No. JP 2017-108958 filed in the Japan Patent Office on Jun. 1, 2017. Each of the above-referenced applications is hereby incorporated herein by reference in its entirety.

TECHNICAL FIELD

The present disclosure relates to an information processing apparatus, information recording medium, an information processing method, and a program. More particular, the disclosure relates to an information processing apparatus that inputs data in an MMT (MPEG Media Transport) format currently standardized for future application to transmission of data by broadcast waves, for example, records the input data to medium, and executes copy control on a process of copying medium-recorded data, the disclosure further relating to information recording medium, an information processing method, and a program for use with the information processing apparatus.

BACKGROUND ART

Today, efforts are underway to standardize the data transmission of high-quality videos such as 4K or 8K videos for broadcast purposes, for example. One such effort is to study data delivery methods using the MMT (MPEG Media Transport) format.

The MMT format stipulates data transfer methods (transport formats) in which encoded data constituting such content as video, audio, and subtitle data, and control information (SI (Signaling Information)) having diverse management information including control and attribute information are transmitted by broadcast waves or over networks.

The MMT format is scheduled to be used in broadcasting next-generation content such as 4K pictures and high-dynamic range (HDR) pictures, for example.

At present, the MPEG-2 TS format is frequently used as a transmission format in which to transmit video, audio, and subtitle data and as a data recording format for recording data onto medium.

The BDMV and BDAV standards (formats) are currently used extensively as recording/reproduction application standards (formats) that comply with the MPEG-2 TS format.

The BDMV and BDAV are application standards for data recording and reproduction mainly by use of a BD (Blu-ray (registered trademark) Disc). These standards are also applicable to data recording and reproduction using not only BD but also other medium such as flash memory or HD.

For example, PTL 1 (Japanese Patent Laid-Open No. 2011-023071) discloses a configuration for data recording and reproduction processes using BD.

The BDMV is an application standard developed for use with BD-ROM discs on which content such as movies is prerecorded. This standard is widely used mainly in conjunction with BD-ROM discs storing packaged content that is non-rewritable.

On the other hand, the BDAV is a standard developed mainly for application to the processes of data recording and reproduction on BD-RE discs that are rewritable or on BD-R discs that are writable only once. The BDAV is used to record and reproduce TV programs or reproduce videos taken by users with a video camera, for example.

To record delivery content in compliance with the above-mentioned MMT format to information recording medium (medium) and to reproduce the content from the medium using a reproduction application supporting the BDAV format requires recording the data in compliance with the BDAV format.

The BDAV format stipulates database files such as playlist files and clip information files as reproduction control information files. A BDAV-compatible reproduction application performs the process of data reproduction by referring to these reproduction control information files (database files). To perform the process of reproducing MMT format data thus requires using the reproduction control information recorded in these playlist files and clip information files.

Furthermore, with the content such as video, audio and subtitle data recorded on recording medium including BD (Blu-ray (registered trademark) Disc), flash memories or hard discs (HD), the user may proceed to copy the medium-recorded data to other, second medium.

However, a large portion of the broadcast content is protected by copyright. Diverse copy control information is set in units of the broadcast content such as in terms of individual TV programs.

For example, varieties of copy control information are set to each unit of the content (programs) in such a manner that there exist copy-permitted content, copy-prohibited content, and the content of which the permitted number of times a copy is made or the number of copies allowed to be made is predetermined. Such copy control information regarding the broadcast content is stored in a packet (TLV packet/MMTP packet) transmitted by broadcast waves together with the program content to a reception apparatus on the user's side.

After such data has been recorded to medium such as BD, a BDAV format-compatible application may be used, for example, to copy the data from the medium.

However, BDAV format-compatible applications in the past do not include any algorithm for determining whether or not copying is permitted by referring to the copy control information stored in an MMTP packet, for example.

Consequently, unless some countermeasures are taken, there is a possibility that the content may be copied uncontrollably without regard to the copy control information transmitted by broadcast waves.

CITATION LIST

Patent Literature

[PTL 1]
Japanese Patent Laid-Open No. 2011-023071

SUMMARY

Technical Problem

The present disclosure has been devised in view of the above circumstances. An object of the disclosure is therefore to provide an information processing apparatus that inputs delivery data in compliance with the MMT format, records the input data to recording medium such as BD, and copies the record data to other medium under secure copy control in compliance with the copy control information set in the initial MMT format data, the disclosure further aiming to provide information recording medium, an information processing method, and a program for use with the information processing apparatus.

Solution to Problem

According to a first aspect of the present disclosure, there is provided an information processing apparatus including a data processing section configured to perform format conversion that involves inputting MMT (MPEG Media Transport) format data with copy control information set therein and converting the input MMT format data to MPEG-2 TS format data so as to generate record data for recording onto an information recording medium. The data processing section acquires, from within the input data, the copy control information corresponding to the MMT format data, converts the acquired copy control information to copy control information stipulated by the MPEG-2 TS format, and generates the record data including the copy control information stipulated by the MPEG-2 TS format.

According to a second aspect of the present disclosure, there is provided an information processing apparatus including a data processing section configured to copy record data from a first medium to s second medium. The first medium records a stream file configured with a packet sequence including a TS packet that stores reproduced data obtained by converting MMT (MPEG Media Transport) format data to MPEG-2 TS format data, and a TS packet that stores copy control information corresponding to the reproduced data. The data processing section executes copy control on the stream file by referring to and complying with the referred copy control information.

According to a third aspect of the present disclosure, there are provided information recording medium having a stream file configured with a TS packet sequence including: a TS packet that stores reproduced data obtained by converting MMT (MPEG Media Transport) format data to MPEG-2 TS format data; and a TS packet that stores copy control information corresponding to the reproduced data. The information recording medium having record data thereon allow an information processing apparatus performing a process of copying the record data on the information recording medium to execute copy control on the stream file by referring to and complying with the referred copy control information.

According to a fourth aspect of the present disclosure, there is provided an information processing method for execution by an information processing apparatus that has a data processing section configured to perform format conversion that involves inputting MMT (MPEG Media Transport) format data with copy control information set therein and converting the input MMT format data to MPEG-2 TS format data so as to generate record data for recording onto an information recording medium. The information processing method includes steps of causing the data processing section to acquire, from within the input data, the copy control information corresponding to the MMT format data, to convert the acquired copy control information to copy control information stipulated by the MPEG-2 TS format, and to generate the record data including the copy control information stipulated by the MPEG-2 TS format.

According to a fifth aspect of the present disclosure, there is provided an information processing method for execution by an information processing apparatus that has a data processing section configured to copy record data from a first medium to a second medium. The first medium records a stream file configured with a packet sequence including a TS packet that stores reproduced data obtained by converting MMT (MPEG Media Transport) format data to MPEG-2 TS format data, and a TS packet that stores copy control information corresponding to the reproduced data. The information processing method includes a step of causing the data processing section to execute copy control on the stream file by referring to and complying with the copy control information.

According to a sixth aspect of the present disclosure, there is provided a program for causing an information processing apparatus to perform information processing. The information processing apparatus has a data processing section configured to perform format conversion that involves inputting MMT (MPEG Media Transport) format data with copy control information set therein and converting the input MMT format data to MPEG-2 TS format data so as to generate record data for recording onto an information recording medium. The program causes the data processing section to perform a process of acquiring from within the input data the copy control information corresponding to the MMT format data, a process of converting the acquired copy control information to copy control information stipulated by the MPEG-2 TS format, and a process of generating the record data including the copy control information stipulated by the MPEG-2 TS format.

According to a seventh aspect of the present disclosure, there is provided a program for causing an information processing apparatus to perform information processing. The information processing apparatus has a data processing section configured to copy record data from a first medium to a second medium. The first medium records a stream file configured with a packet sequence including a TS packet that stores reproduced data obtained by converting MMT (MPEG Media Transport) format data to MPEG-2 TS format data, and a TS packet that stores copy control information corresponding to the reproduced data. The program causes the data processing section to execute copy control on the stream file by referring to and complying with the copy control information.

Incidentally, the program of the present disclosure may be offered in a computer-readable format via storage medium or communication medium to an information processing apparatuses or a computer system capable of executing diverse program codes, for example. When provided with such a program in a computer-readable manner, the information processing apparatus or the computer system performs the processes defined by the program.

Other objects, features and advantages of the present disclosure will become apparent upon a reading of the ensuing more detailed description of some preferred embodiments of this disclosure with reference to the appended drawings. In this description, the term "system" refers to an aggregate of logically configured apparatuses. The apparatuses in such a configuration may or may not be housed in a single enclosure.

Advantageous Effect of Invention

According to some preferred embodiments of the present disclosure, configurations are provided that convert MMT format data to MPEG-2 TSV format data for recording onto medium under copy control in compliance with the initial copy control information.

Specifically, MMT format data with the copy control information set therein is input and converted to MPEG-2 TS format data before being recorded onto information recording medium, for example. The copy control information recorded in the service description table (MH-SDT) stipulated by the MMT format is acquired and, in accordance with predetermined conversion rules, used to generate copy control information to be recorded to the program map table (PMT) stipulated by the MPEG-2 TS format. Values of EPN and CCI to be recorded to the PMT are determined in accordance with the conversion rules, for example.

The disclosed configurations allow MMT format data to be converted to MPEG-2 TSV format data for recording to medium under copy control in compliance with the initial copy control information.

Incidentally, the advantageous effect stated in this description are only examples and not limitative of the present disclosure that may also provide other advantages.

BRIEF DESCRIPTION OF DRAWINGS

FIG. 2 is an explanatory diagram explaining the MMT format.

FIGS. 6A, 6B, and 6C are explanatory diagrams explaining the MPEG-2 TS format.

FIGS. 7A, 7B, and 7C are another explanatory diagrams explaining the MMT format.

FIG. 12 is an explanatory diagram explaining the copy control information transmitted typically from a broadcast station together with program content.

FIG. 13 is another explanatory diagram explaining the copy control information transmitted typically from a broadcast station together with program content.

FIG. 14 is a tabular diagram depicting the data configuration (syntax) of a service description table (MH-SDT) stored in an MMTP packet.

FIG. 15 is an explanatory diagram explaining the data configuration (syntax) of a content copy control descriptor.

FIG. 16 is an explanatory diagram explaining the data configuration (syntax) of a content usage control descriptor.

FIG. 17 is a tabular diagram listing different modes (5 modes) of digital copy control and the settings of three types of control information stipulated by the MMT format.

FIG. 18 is an explanatory diagram explaining a program map table (PMT) stipulated by the MPEG-2 TS format.

FIG. 19 is an explanatory diagram explaining the data configuration (syntax) of a copy status descriptor (copy_status_descriptor).

FIG. 20 is an explanatory diagram explaining an exemplary data configuration of a private data recording area.

FIG. 21 is an explanatory diagram explaining details of EPN and CCI.

FIG. 22 is an explanatory diagram explaining exemplary conversion rules for converting the copy control information complying with the MMT format to the copy control information complying with the MEG-2 TS format.

FIG. 23 is an explanatory diagram explaining an exemplary configuration of an information processing apparatus that executes the process of recording data onto information recording medium (medium).

FIG. 25 is a flowchart explaining a process sequence of the process of recording data onto information recording medium (medium).

FIG. 28 is an explanatory diagram explaining an exemplary hardware configuration of an information processing apparatus used to perform the processing of the present disclosure.

DESCRIPTION OF EMBODIMENTS

Described below in detail with reference to the accompanying drawings are an information processing apparatus, information recording medium, an information processing method, and a program of the present disclosure. The description will be given under the following headings.

1. Exemplary Configuration of Communication System
2. MMT (MPEG Media Transport) Format
3. BDAV format and SPAV Format
4. Examples of MMT Format Data Input Process, Medium Recording Process, and Copying Process
5. Copy Control Information Set in MMT Format Data
6. Process of Recording the Copy Control Information in the Case Where MMT Format Data is Converted to MPEG-2 TS Format Data when Recorded
7. Configuration and Processing of the Information Processing Apparatus That Executes Process of Recording Data onto Information Recording Medium
8. Configuration and Processing of Information Processing Apparatus That Executes Process of Copying Data between Information Recording Medium
9. Exemplary Configuration of Information Processing Apparatus
10. Summary of Configurations of Present Disclosure

[1. Exemplary Configuration of Communication System]

Figure 1:
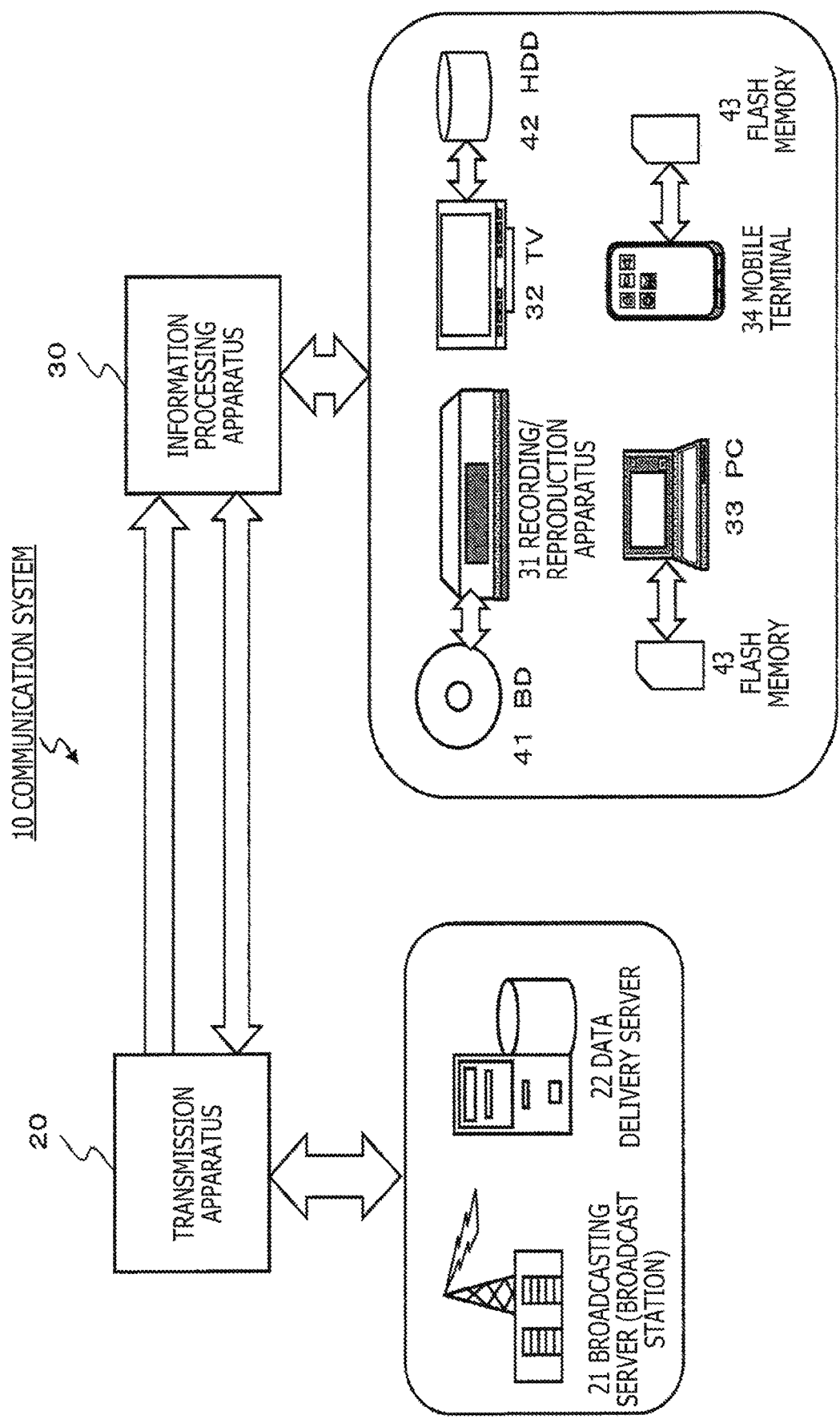
FIG. 1 is an explanatory diagram explaining an exemplary configuration in which an information processing apparatus for executing the processing of the present disclosure is used.

Explained first with reference to FIG. 1 is a communication system as an exemplary configuration that uses the information processing apparatus for executing the processing of the present disclosure.

An information processing apparatus 30 depicted in FIG. 1 is an apparatus to which such medium as a BD (Blu-ray (registered trademark) Disc), a flash memory, and a hard disc (HDD) are attached, the information processing apparatus 30 executing the process of recording data onto the attached medium, the process of reproducing data from the attached medium, and the process of copying data to another medium.

The data recorded onto the medium by the information processing apparatus 30 is transmission content provided by a transmission apparatus 20 such as a broadcast station (broadcasting server) 21 or a data delivery server 22. Specifically, the data may be broadcast programs offered by TV stations.

The transmission content is transmitted from the transmission apparatus 20 to the information processing apparatus 30 by broadest waves or over networks such as the Internet.

The information processing apparatus 30 is a recording/reproduction apparatus 31, a TV set 32, a PC 33, or a mobile terminal 34, for example. Various media such as a BD (Blu-ray (registered trademark) Disc) 41, an HDD (hard disk) 42, or a flash memory 43 are attached to these information processing apparatuses that perform the process of recording data onto the attached medium, the process of reproducing data from the attached medium, and the process of copying data between the medium.

The transmission apparatus 20 transmits data to the information processing apparatus 30 in compliance with the MMT (MPEG Media Transport) format.

The MMT format stipulates the data transfer method (transport format) in which encoded data constituting such content as video, audio and subtitles is transmitted by broadcast waves or over networks.

The transmission apparatus 20 encodes content data, generates data files that include the encoded data and metadata regarding the encoded data, stores the encoded data thus generated in MMT Protocol (MMTP) packets stipulated by the MMT, and transmits the packets by broadcast waves or over networks.

The data provided by the transmission apparatus 20 to the information processing apparatus 30 is configured with reproduction target data such as video, audio and subtitle data, as well as control information (SI: Signaling Information) having guidance information such as program guides and diverse management information including notification information and control messages.

[2. MMT (MPEG Media Transport) Format]

As described above, the transmission of data from the transmission apparatus 20 to the information processing apparatus 30 is executed in compliance with the MMT (MPEG Media Transport) format. The MMT (MPEG Media Transport) format will be explained hereunder with reference to FIG. 2 and subsequent drawings.

FIG. 2 depicts a stack model of the MMT format. At the bottom of the MMT stack model depicted in FIG. 2 is a physical layer (PHY). The physical layer is divided into two layers: a broadcasting layer in which broadcast-related processes are performed, and a broadband layer in which network-related processes are carried out.

The MMT permits processing using two types of communication networks dealing with broadcast-based communication and network-based communication.

Above the physical layer (PHY) is the TLV (Type Length Value) layer. The TLV is a format definition layer that stipulates the IP packet multiplexing scheme. Multiple IP packets are multiplexed into a TLV packet when transmitted. The TLV-SI is a layer that transmits the control information (SI) such as control messages in compliance with the TLV format.

The control information (SI) includes setting information necessary for the information processing apparatus 30 to receive and reproduce content (programs), guidance information such as program guides, and management information including notification information and control information.

The control information (SI) stored in a TLV packet generated in the TLV layer is the TLV-SI constituted mainly by the control information regarding reception processing.

The control information (SI) stored in an MMTP packet, which is generated in accordance with the MMT protocol (MMTP), is the MMT-SI indicated in the topmost layer. The MMT-SI is formed mainly by the control information regarding reproduction control.

The UDP/IP layer is established on the TLV layer.

The UDP/IP layer, which may be divided specifically into the IP layer and the UDP layer, is a layer that stipulates the transmission of IP packet payloads with UDP packets stored therein.

The MMT layer and the File delivery method layer are established on the UDP/IP layer.

The settings are made here to permit parallel usage of two transmission methods: one method involving storing the MMTP packet in the IP packet for transmission, the other method involving transmitting data in IP packets by use of the file delivery method, which is a data transmission method without recourse to the MMTP packets.

The following layers are established on the MMT layer.

a layer of video data encoded in accordance with the HEVC (High Efficiency Video Coding), which is a video encoding standard, a layer of audio data encoded in accordance with the AAC (Advanced Audio Coding), which is an audio encoding standard, a layer of subtitle data encoded in accordance with the TTML (Timed Text Markup Language), which is a subtitle encoding standard, a layer of control information (MMT-SI) transmitted by use of an MMTP packet, and a layer of various applications described in HTML-5 (Hyper Text Markup Language 5).

The above items of data are stored in the MMTP packet when transmitted.

The control information (MMT-SI) is the signaling information transmitted by the MMTP packet, the information being configured with setting information necessary for the information processing apparatus 30 to reproduce content (programs), guidance information such as program guides, and diverse management information including notification information and control information.

Incidentally, time information (NTP: Network Time Protocol), is absolute time information that is directly stored in a UDP packet when transmitted.

The above configuration is further arranged to provide data service for delivery of other data, and content download, etc. for delivering data using a file delivery method different from that of the MMT.

As depicted in FIG. 2, an MMTP packet is used to transmit video data, audio data and subtitle data, the control information (MMT-SI) having diverse management information including various notification information and control information; and applications.

Specific configuration examples of the MMTP packet are explained below with reference to FIGS. 3A, 3B, 3C, and 3D.

FIGS. 3A, 3B, 3C, and 3D depict the following four data configuration examples.

Figure 3:
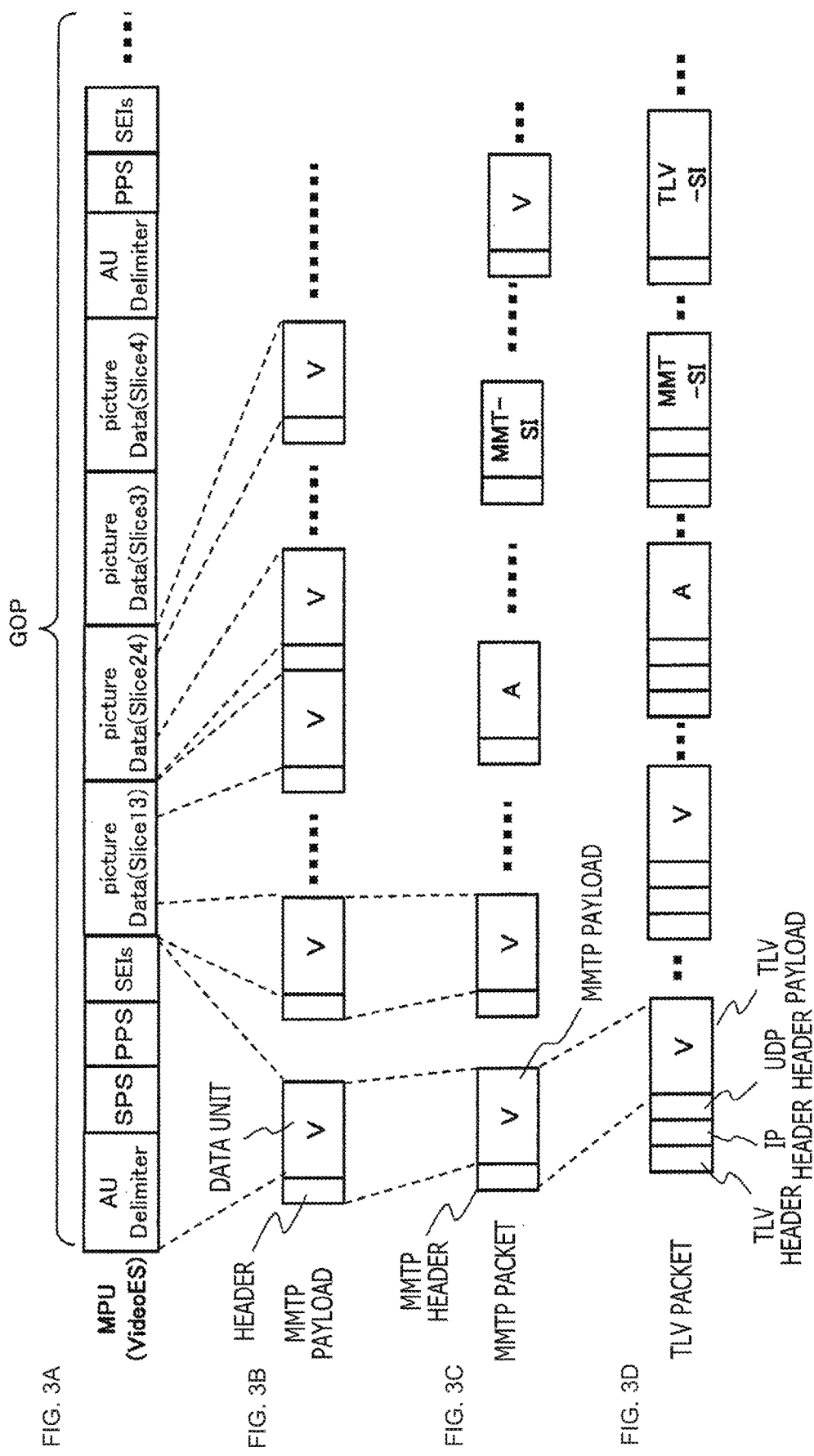
FIGS. 3A, 3B, 3C, and 3D are explanatory diagrams explaining an exemplary configuration in which video data is stored in compliance with the MMT format.

FIG. 3A MPU (Media Presentation Unit)
FIG. 3B MMTP payload
FIG. 3C MMTP packet
FIG. 3D TLV packet The TLV packet (d) above is transmitted by broadcast waves or over networks. Header information having a UDP header, an IP header, and a TLV header is set in the TLV packet. The TLV packet is set individually as a packet for each different data type.

That is, the TLV payload of a single TLV packet stores one type of data. Specifically, video (V) data, audio (A) data, subtitle (S) data, and control information (SI) having diverse management information are placed individually in the TLV payloads of different TLV packets.

The control information (SI) is of two types: the control information stored in an MMTP packet (MMT-SI), and the control information transmitted by a TLV packet (TLV-SI). Each type of control information is stored individually in a different TLV packet.

An example of the TLV payload, which is the payload of a TLV packet, is depicted in FIG. 3C as an MMTP packet.

The MMTP packet in FIG. 3C is formed with an MMTP header and an MMTP payload.

The MMTP payload in a single MMTP packet stores one type of data. Specifically, one of such types of data as video (V) data, audio (A) data, subtitle (S) data, and control information (MMT-SI) is stored individually in a single MMTP packet.

FIGS. 3A and 3B depict detailed configurations of video data stored in the MMTP payload of the MMTP packet illustrated in FIG. 3C.

FIG. 3B selectively indicates only those of the MMTP packets in FIG. 3C that have their MMTP payloads set with video (V) data.

The MMTP payload depicted in FIG. 3B is formed with a header and a data unit.

As depicted in FIG. 3A, the data unit stores video data as well as the following parameters.

AU Delimiter (Access Unit Delimiter)
SPS (Sequence Parameter Set)
PPS (Picture Parameter Set)
SEIs (Supplemental Enhancement Information)

These parameters are used for video display.

The MPU (Media Presentation Unit) depicted in FIG. 3A is a unit for use in processing reproduction target data such as video, audio, and subtitle data in the MMT format. The example indicated in FIG. 3A is an exemplary MPU of video data, which is the same as a so-called Group of Pictures (GOP) constituting the unit encoding and decoding processes.

Thus as depicted in FIG. 3A, the video data is divided into the parameters and video configuration data as stipulated by the MMT format. They are stored in the MMTP payload depicted in FIG. 3B to make up the MMTP packet indicated in FIG. 3C.

Furthermore, the MMTP packet is set to be the payload of a TLV packet illustrated in FIG. 3D, the TLV packet being transmitted by broadcast waves or over networks.

Different types of data such as audio data and subtitle data, as well as different types of data in the MMT-SI are each set in an MMTP packet or in a TLV packet as a data type unit when transmitted.

The TLV-SI is stored not in the MMTP packet but in the TLV packet when transmitted.

[3. BDAV Format and SPAV Format]

Explained below with reference to FIG. 4 and subsequent drawings are the BDAV format and SPAV format, i.e., record data formats in which the delivery content complying with the above-described MMT format is recorded to and reproduced from medium such as BD (Blu-ray (registered trademark) Disc), a flash memory, or an HD (hard disc).

To reproduce content such as video, audio and subtitles from medium such as a BD (Blu-ray (registered trademark) Disc), a flash memory, or an HD requires reproduction control information and index information for performing the process of reproducing such content. The reproduction control information and index information are generally referred to as database files.

The reproduction control information and the index information vary depending on the reproduction application that executes the process of reproducing medium-recoded data.

As discussed above, the BDMV and BDAV standards (data recording formats) are currently stipulated as recording and reproduction application standards (=data recording formats). These application standards were worked out as data recording and reproduction application standards that mainly use a BD (Blu-ray (registered trademark) Disc).

Although the BDMV and BDAV standards are application standards and also data recording formats (standards) for data recording and reproduction mainly by use of BD, these standards may also be applied to data recording and reproduction using medium other than BD such as flash memories.

The BDMV is an application standard developed for use with BD-ROM on which content such as movies is prerecorded. The BDMV standard is widely used mainly in conjunction with BD-ROM discs storing packaged content that is non-rewritable.

On the other hand, the BDAV is a standard developed mainly for application to the processes of data recording and reproduction on BD-RE discs that are rewritable or on BD-R discs that are writable only once. The BDAV is used to record and reproduce TV programs or videos taken by users with a video camera, for example.

To perform the process of content reproduction on the medium on which delivery content is recorded in accordance with the above-described MMT format through the use of a reproduction application supporting the BDAV format requires that the data be recorded in compliance with the BDAV format.

As discussed above, the BDAV format stipulates playlist files and clip information files as files that record reproduction control information. A BDAV-compatible reproduction application performs the process of data reproduction by referring to these reproduction control information files (database files).

Figure 4:
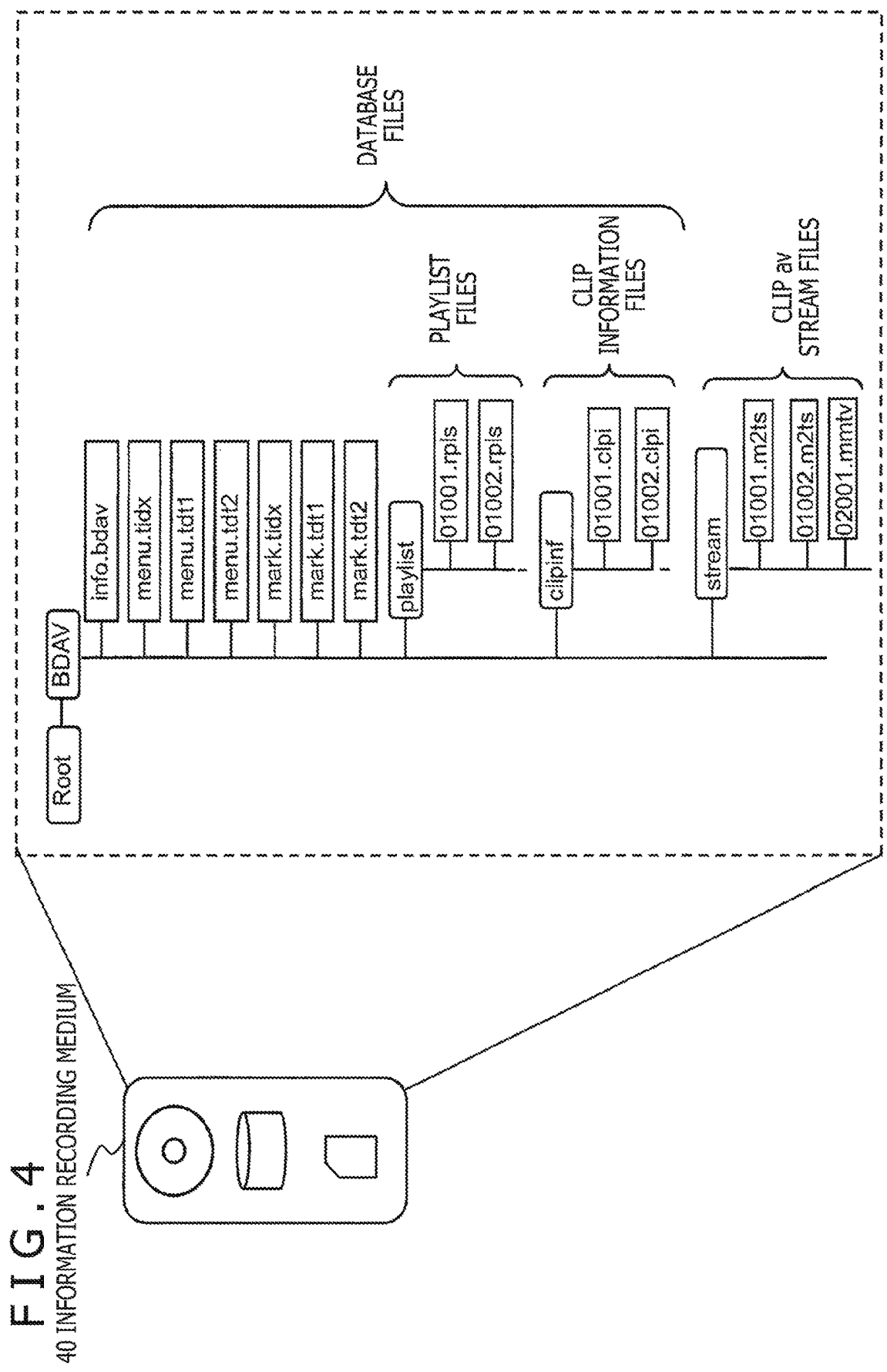
FIG. 4 is an explanatory diagram explaining the BDAV format.

FIG. 4 depicts an exemplary directory configuration of data recorded onto information recording medium (medium) 40 in accordance with the BDAV format.

In the directory, files storing diverse management information, reproduction control information, and reproduction target data are set as depicted in FIG. 4.

Management information files are formed, for example, with info files (info), menu files (menu), and mark files (mark) depicted in FIG. 4. These files mainly store title management information to be viewed by the user.

Playlist files (playlist) and clip information files (clipinf), for example, are recorded as the reproduction control information files.

Furthermore, clip AV stream files (stream) are recorded as reproduced data storage files.

The playlist files stipulate the sequence of content items to be reproduced in accordance with the program information of the reproduction program designated by the title. For example, a playlist file holds the information designating the clip information files each recording the information regarding reproduction positions.

The clip information files designated by the playlist files hold reproduction position information regarding clip AV stream files.

The clip AV stream files store the AV stream data to be reproduced as well as management information. Each clip AV stream file includes the video, audio, and subtitle data to be reproduced and by packets storing management information.

Incidentally, PSI/SI (Program Specific Information/Service Information) is an example of the management information stipulated by the MPEG-2 TS format and recorded in clip AV stream files.

The broadcast in the past data and network-delivered data are MPEG-2 TS format data including TS (Transport Stream) packets. From now on, the data of high-definition videos such as 4K or 8K videos are expected to be handled as MMT format data formed with the above-described MMTP packets.

FIG. 4 depicts two types of clip AV stream files (stream): stream files (nnnnn.m2ts) including MPEG-2 TS format data formed with TS packets, and an MMT format data stream file (nnnnn.mmtv) including MMTP packets.

The exemplary directory depicted in FIG. 4 specifies that if the data received by the information processing apparatus 30 is MPEG-2 TS format data, the received data is to be recorded directly onto medium as MPEG-2 TS format data, and that if the received data is MMT format data, the received data is to be recorded onto medium as MMT format data.

In the case where MMT format data is to be recorded onto medium, the following two types of processes are presumably performed to generate a clip AV stream file:

(1) The MMT format data is converted to MPEG-2 TS format data for use in generating the clip AV stream file; or (2) A sequence of packets storing the data in compliance with the MMT format is used to generate the clip AV stream file.

Specifically, the process (1) above involves recording the data as a sequence of TS packets stipulated by the MPEG-2 TS format.

The process (2) above involves, specifically, recording the data as a sequence of MMTP (MMT Protocol) packets stipulated by the MMT format or as a sequence of TLV (Type Length Value) packets that are hierarchically above the MMTP packets.

The data files including the management information files, playlist files, and clip information files are files that store the management information applied to the process of reproducing video, audio and subtitle data as reproduced data stored in clip AV stream files. These data files store the reproduction control information and the attribute information regarding the reproduced data. As such, the files are called database files.

The sequence in which the content recorded on information recording medium is reproduced is as follows.

(a) First, a particular title is designated by the reproduction application from the management information file.

(b) The playlist associated with the designated title is selected.

(c) In accordance with the clip information stipulated by the selected playlist, an AV stream as actual content data or a command is read out, and the AV stream is reproduced or the command is executed.

Figure 5:
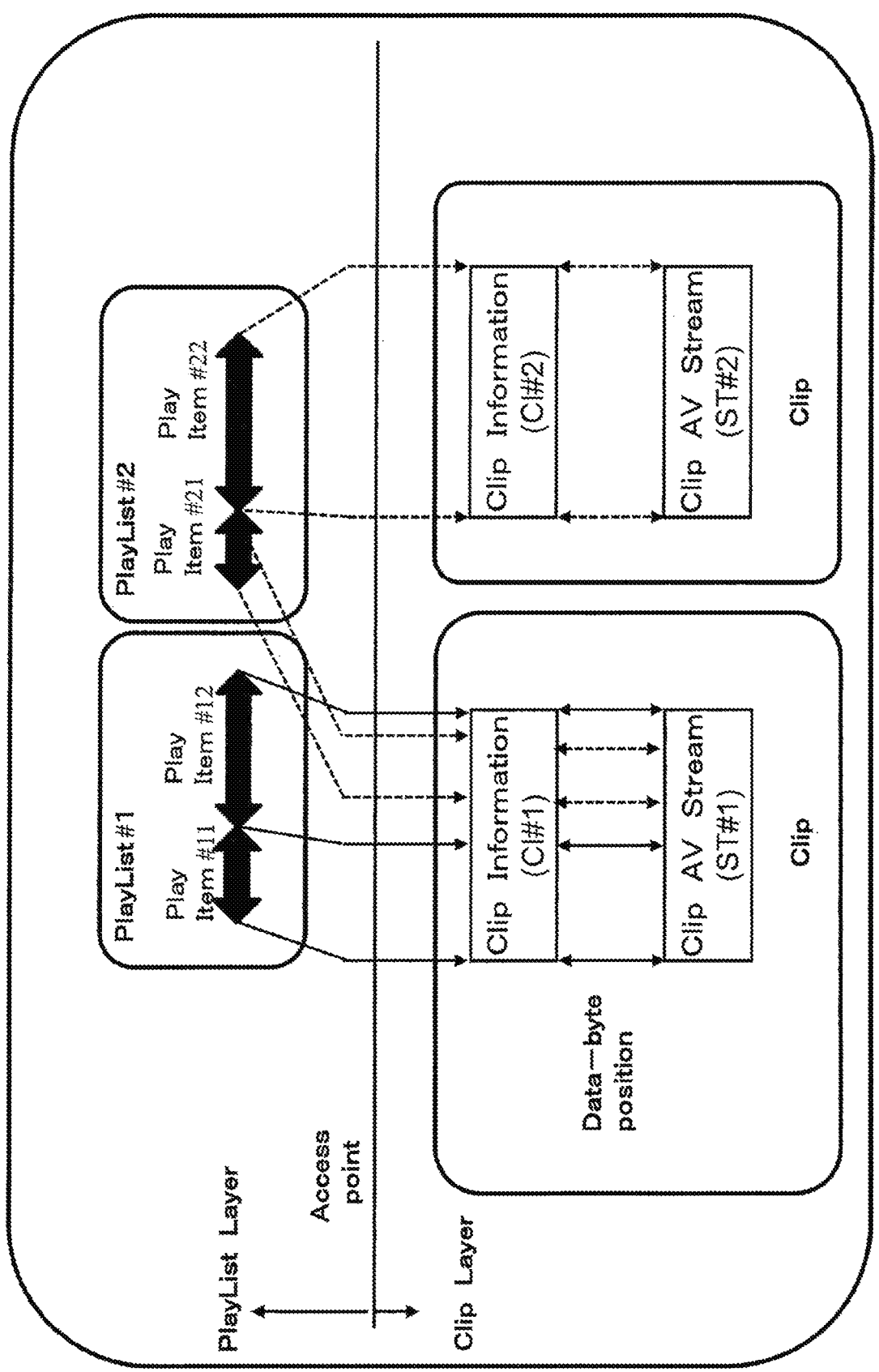
FIG. 5 is an explanatory diagram explaining an example of the process of reproducing data in compliance with the BDAV format.

FIG. 5 explains the relations of correspondence between the following data, i.e., between the following files recorded onto the information recording medium (medium) 40:

Playlist files;
Clip information files; and
Clip AV stream files.

AV streams including video, audio and subtitle data as the actual reproduction target data are recorded as clip AV stream files. Playlist files and clip information files are further stipulated as files that store the management information and reproduction control information regarding the AV streams.

As depicted in FIG. 5, the files of these multiple categories may be divided into two layers: a playlist layer including playlist files, and a clip layer including clip AV stream files and clip information files.

One clip AV stream file is associated with one clip information file. The paired files are considered an object and are collectively called a clip or a clip file.

Detailed information regarding the data included in clip AV stream files, such as management information including EP maps that record I-picture position information regarding MPEG data, is recorded in clip information files.

The clip AV stream file is formed with TS packets in the case where MPEG-2 TS format data is stored therein.

The clip AV stream file includes MMTP packets or TLV packets in the case where MMT format data is stored therein.

Incidentally, the clip AV stream files store not only reproduced data such as video, audio and subtitle data but also diverse reproduction control information.

The clip AV stream file including TS packets in compliance with the MPEG-2 TS format stores individual TS packets organized by different reproduced data types covering video, audio and subtitle data, as well as control information storage TS packets that record the attribute information and control information regarding each type of reproduced data, for example. Each packet is set with a packet ID (PID). The packet IDs (PIDs) may be used as a basis for determining the type of data stored in each packet.

The control information stored in a TS packet may be a program map table (PMT), for example.

On the other hand, the clip AV stream file including MMTP packets or TLV packets in compliance with the MMT format also stores individual MMTP packets or TLV packets organized by different reproduced data types covering video, audio and subtitle data, as well as control information storage MMTP packets or TLV packets that record the attribute information and control information regarding each type of reproduced data, for example. Each packet is set with a packet ID (PID). The packet ID (PID) may be used as a basis for determining the type of data stored in each packet.

The control information stored in an MMTP packet or in a TLV packet may be an MMT package table (MPT), for example.

The clip information files store, for example, management information for acquiring the reproduction start positions of the data stored in clip AV stream files, such as the data representing the correspondence between the data positions of byte sequence data in clip AV stream files on the one hand and the reproduction time positions such as reproduction start points or entry points (EP) of the byte sequence data on the time axis on the other hand.

The playlists hold information indicative of access points corresponding to the reproduction start and end points of clips by use of timestamps as information along the time axis.

For example, clip information files are referenced on the basis of the timestamps indicative of reproduction time elapse positions from the start points of content. Referencing the clip information files in this manner makes it possible to acquire the data readout positions of clip AV stream files, i.e., addresses representing the reproduction start points.

The clip information files are used to detect, from the timestamps, information regarding the addresses at which to start decoding the streams in clip AV stream files.

In this manner, the playlist files hold information designating the reproduction intervals of reproducible data included in the clip layer (=clip information files plus clip AV stream files).

Each playlist file is set with at least one play item. Each play item holds the information designating the reproduction interval of the reproducible data included in the clip layer (=clip information files plus clip AV stream files).

As described above, the clip AV stream files storing reproduction target data are each formed with TS packets in the case where MPEG-2 TS format data in the past is stored therein.

The clip AV stream files are each formed with MMTP packets or with TLV packets in the case where high-definition video data such as 4K or 8K video data to be handled as MMT format data from now on is stored therein.

The MMT format and the MPEG-2 TS format are explained below by referring to FIGS. 6A, 6B, 6C, 6D, 7A, 7B and 7C.

First, the MPEG-2 TS format is explained by referring to FIGS. 6A, 6B and 6C.

The MPEG-2 TS format stipulates the data storage format (container format) in which to store encoded data as content configuration data such as video, audio and subtitle data as well as management information (PSI/SI) onto recording medium or in which to store the encoded data and other information for transmission by broadcast waves or over networks.

The MPEG-2 TS format, standardized by the ISO 13818-1, is currently used for recording data onto a BD (Blu-ray (registered trademark) Disc) and for performing digital broadcasting, for example.

FIGS. 6A, 6B, and 6C depict configurations of MPEG-2 TS format data. FIG. 6A illustrated at the bottom illustrates an overall configuration of MPEG-2 TS format data.

As depicted in FIG. 6A, MPEG-2 TS format data includes multiple elementary streams.

The elementary streams each constitute a unit of video, audio, and subtitle data, for example.

One elementary stream, as depicted in FIG. 2B, is formed with one or multiple PES (Packetized Elementary Stream) packets.

Specifically, one elementary stream is formed with one or multiple PES packets each being of a payload type (Payload_type)=0×0 and each having the same packet identifier (Packet_id).

As depicted in FIG. 6C, one PES packet is formed with one or multiple TS packets.

Specifically, one PES packet is formed with one or multiple TS packets each being of the payload type (Payload_type)=0×0 and each having the same packet identifier (Packet_id).

Unlike the above-described MMTP packets, the TS packets each have a fixed length. The packet size of one TS packet is fixed to 188 bytes.

The MMT (MPEG Media Transport) format is explained below with reference to FIGS. 7A, 7B, and 7C.

The MMT format, already mentioned above with reference to FIGS. 3A, 3B, and 3C, are depicted in the explanatory diagram of FIGS. 7A, 7B, and 7C give an easy-to-understand illustration of the corresponding relation to the MPEG-2 TS format discussed above with reference to FIGS. 6A, 6B, and 6C.

As explained above, the MMT format stipulates the data transfer format (transport format) in which to transfer encoded data as content configuration data such as video, audio and subtitle data by broadcast waves or over networks.

FIGS. 7A, 7B, and 7C are explanatory diagrams explaining the MMT format as a file format stipulated in the ISO/IEC 23008-1.

FIGS. 7A, 7B, and 7C depict configurations of MMT format data.

FIG. 7A illustrated at the bottom illustrates an overall configuration of MMT format data.

As depicted in FIG. 7C, MMT format data includes multiple media Presentation Units (MPU: Medium Presentation Unit).

The MPUs each constitute a unit of video, audio, and subtitle data, for example. In the case of video data, for example, one MPU corresponds to one GOP (Group of Picture) constituting one MPEG video compression unit.

One MPU includes one or multiple medium fragment units (MFU) as depicted in FIG. 7B.

Specifically, one MPU is formed with one or multiple MFUs each being of a payload type (Payload_type)=0×0 (MPU) and each having the same packet identifier (Packet_id).

One MFU, as depicted in FIG. 7C, includes one or multiple MMTP packets.

Specifically, one MFU is formed with one or multiple MMTP packets each being of the payload type (Payload_type)=0×0 (MPU) and each having the same packet identifier (Packet_id).

The MMTP packets each have a variable length and may be set to diverse packet sizes.

Each MMTP packet is formed with a header that stores attribute information (MMTP header) and a payload that stores the actual data of encoded pictures (MMTP payload).

Incidentally, the SPAV format is a format that resembles the BDAV format. As discussed above, the BDMV and the BDAV are application standards applied mainly to data recording and reproduction using BD. The SPAV format, by contrast, is an application standard mainly for data recording and reproduction to and from hard discs.

It is to be noted, however, that both the BDAV format and the SPAV format can be applied to data recording and reproduction using diverse medium including BD, flash memories, and HD.

SPAV format data may be recorded and reproduced by the same processes of data recording and reproduction in the BDAV format. However, the file name setting of the SPAV format is partially different from that of the BDAV format.

Figure 8:
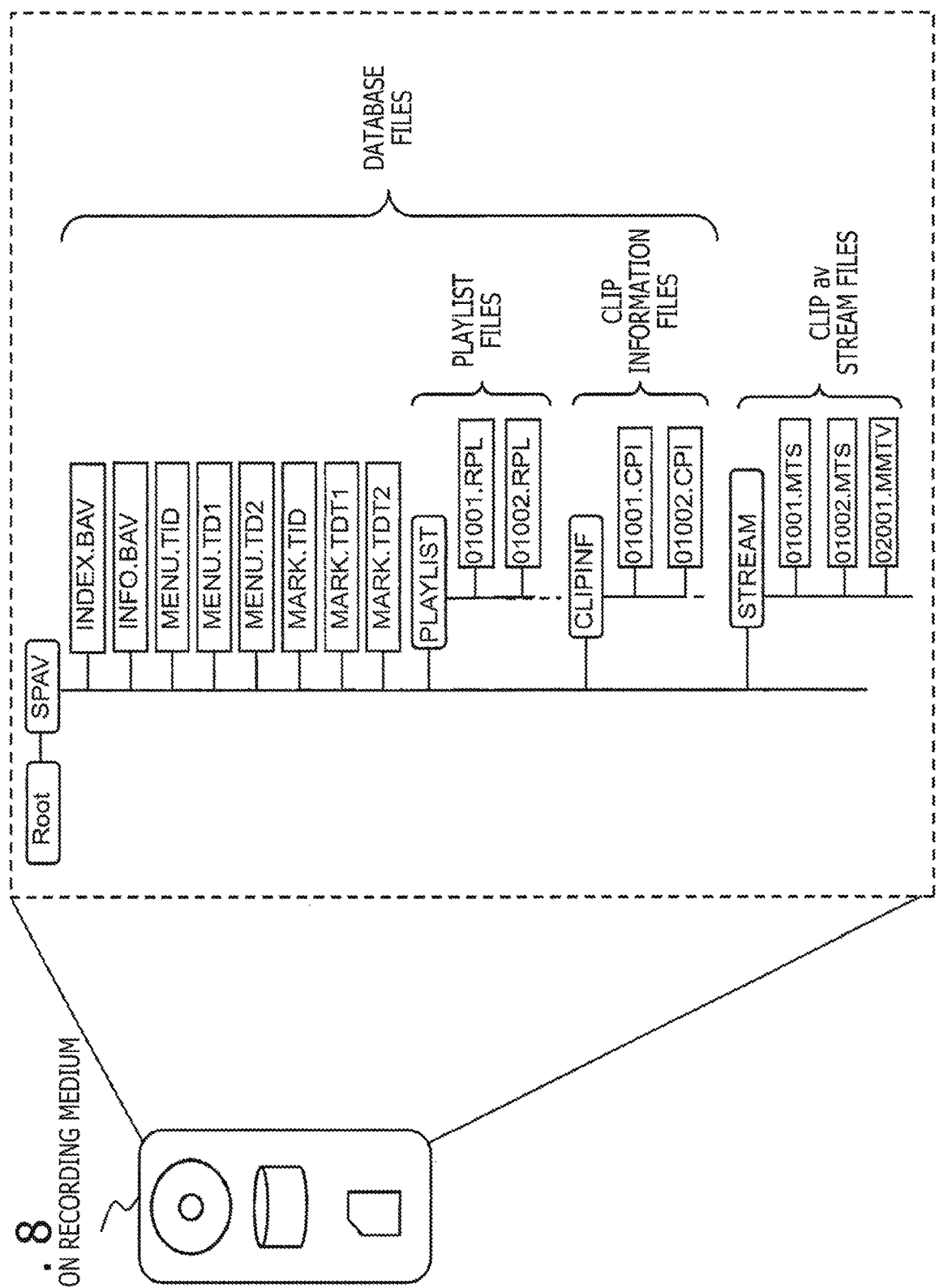
FIG. 8 is an explanatory diagram explaining an SPAV format.

FIG. 8 depicts an exemplary directory configuration of the SPAV format.

In the directory of the SPAV format depicted in FIG. 8, as in the BDAV format explained above with reference to FIG. 4, storage files are established to accommodate diverse management information, reproduction control information, and reproduction target data.

The management information files are configured, for example, with an info file (INFO), menu files (MENU), and mark files (MARK) depicted in FIG. 8. These files mainly store the title management information to be viewed by the user.

Playlist files (PLAYLIST) and clip information files (CLIPINF) are recorded as the reproduction control information files, for example.

Furthermore, clip AV stream files (STREAM) are recorded as the reproduced data storage files.

As depicted in FIG. 8, the directory names and the extension settings of the files in the SPAV format are different from those in the BDAV format explained above with reference to FIG. 4.

However, the data stored in each of the files and roles of these files are the same as in the BDAV format.

Described below is an embodiment as a processing example in which MMT format data is recorded, reproduced, and copied as BDAV format data. The embodiment described below can also be applied to the processes of recording, reproducing, and copying MMT format data as SPAV format data.

[4. Examples of MMT Format Data Input Process, Medium Recording Process, and Copying Process]

Explained below are examples of the processes of inputting MMT format data, recording MMT format data onto medium, and copying MMT format data.

As discussed above, the MMT format is a data delivery format for use in transmitting 4K or 8K video data scheduled for delivery from now on by broadcast stations. This in a format that complies with the protocol stack explained above with reference to FIG. 2.

On the other hand, the BDAV format is a data recording format for use with medium. As discussed above with reference to FIG. 4, the BDAV format stipulates the database files including playlist files and reproduction control information files such as clip information files.

The BDAV format, while serving as a data recording format, also complies with data recording and reproduction application standards. The data recorded onto medium in accordance with the BDAV format is reproduced therefrom by use of a reproduction application supporting the BDAV format.

Thus, to record delivery content onto medium in compliance with the MMT format and to reproduce the recorded content therefrom using a reproduction application supporting the BDAV format requires that the data be recorded in accordance with the BDAV format.

As mentioned above, discussions are currently underway on how to expand the BDAV format so as to record and reproduce MMT format data.

As discussed above, in the case where MMT format data is to be recorded onto medium, the following two types of processes can be performed in constituting a clip AV stream file:

(1) The MMT format data converted to MPEG-2 TS format data is used to generate and record the clip AV stream file including a TS packet sequence; or (2) A sequence of packets (MMTP packets or TLV packets) storing the data in compliance with the MMT format is used to generate and record the clip AV stream file.

Explained below is the copy control on the data that is converted from the MMT format to the MPEG-2 TS format before being used to generate a clip AV stream file including a TS packet sequence and recorded onto information recording medium (medium).

Specifically, the data subjected to format conversion (from MMT to MPEG-2 TS) and recorded onto medium is arranged to be copied under secure copy control based on the copy control information inherited from and associated with the initial data, i.e., the MMT format data transmitted typically by the transmission apparatus of a broadcast station or the like.

For example, suppose that the MMT format data transmitted typically by the transmission apparatus of a broadcast station or the like and converted to MPEG-2 TS format data is used to generate a clip AV stream file including a TS packet sequence and recorded onto storage medium such as a BD (Blu-ray (registered trademark) Disc), a flash memory or an HD (hard disc). In such a case, the user may further copy the medium-recorded data to other, second medium.

However, as discussed above, a large portion of the broadcast content is protected by copyright. Diverse copy control information is set in units of the broadcast content such as in terms of individual TV programs.

For example, varieties of copy control information are set to each unit of the content (programs) in such a manner that there exist copy-permitted content, copy-prohibited content, and the content of which the permitted number of times a copy is made or the number of copies allowed to be made is predetermined.

Such copy control information regarding the broadcast content is stored in packets (TLV packet/MMTP packet) transmitted by broadcast waves together with the program content to the information processing apparatus on the user's side.

After such data has been recorded onto medium such as BD, the recorded data may be subjected to a copying process using a BDAV format-compatible application (=data processing application supporting the MPEG-2 TS format), for example.

The copying process should be performed in such a manner as to be strictly in compliance with the copy control information transmitted by broadcast waves.

However, there have yet to be definitive rules on how to copy onto medium such as BD the copy control information stored in packets (TLV packets/MMTP packets) and transmitted by broadcast waves. Unless some countermeasures are taken, there is a possibility that the copying process may be performed uncontrollably without regard to the copy control information transmitted by broadcast waves.

The present disclosure aiming to solve the above problem provides configurations that enable secure copy control over the data subjected to format conversion (from MMT to MPEG-2 TS) and recorded onto medium in compliance with the copy control information set in the initial MMT format data prior to the format conversion.

The data that is subject to copy control in the configurations of the present disclosure is the data recorded on information recording medium (medium).

The data is MMT format data transmitted typically by the transmission apparatus of a broadcast station or the like and converted to MPEG-2 TS format data when recorded onto recording medium such as a BD (Blu-ray (registered trademark) Disc), a flash memory, or an HD (hard disc).

The data stored in TS packets stipulated by the MPEG-2 TS format is subject to copy control.

Figure 9:
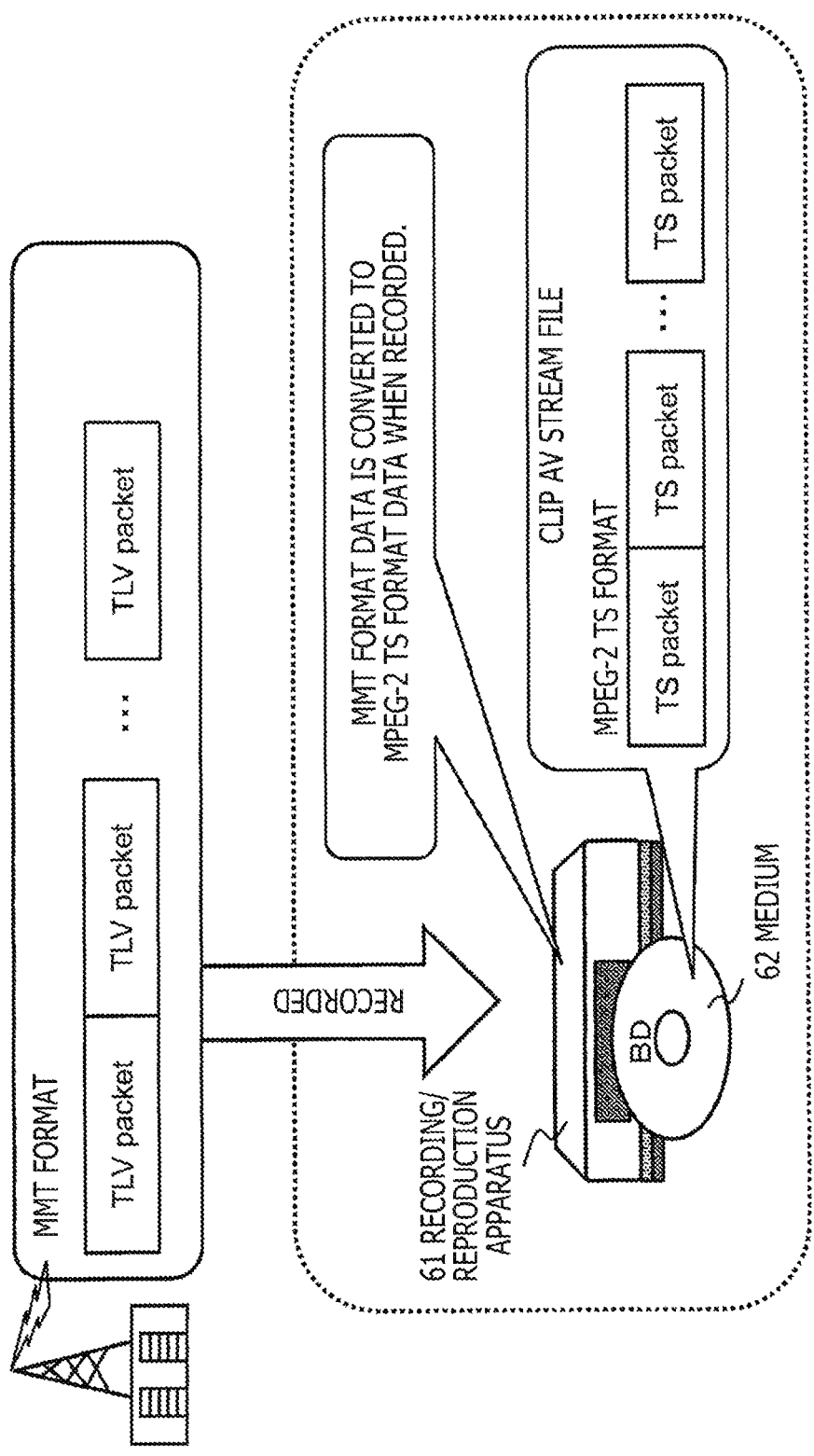
FIG. 9 is an explanatory diagram explaining an example of the process of converting MMT format data to MPEG-2 TS format data for recording onto information recording medium (medium).
Figure 10:
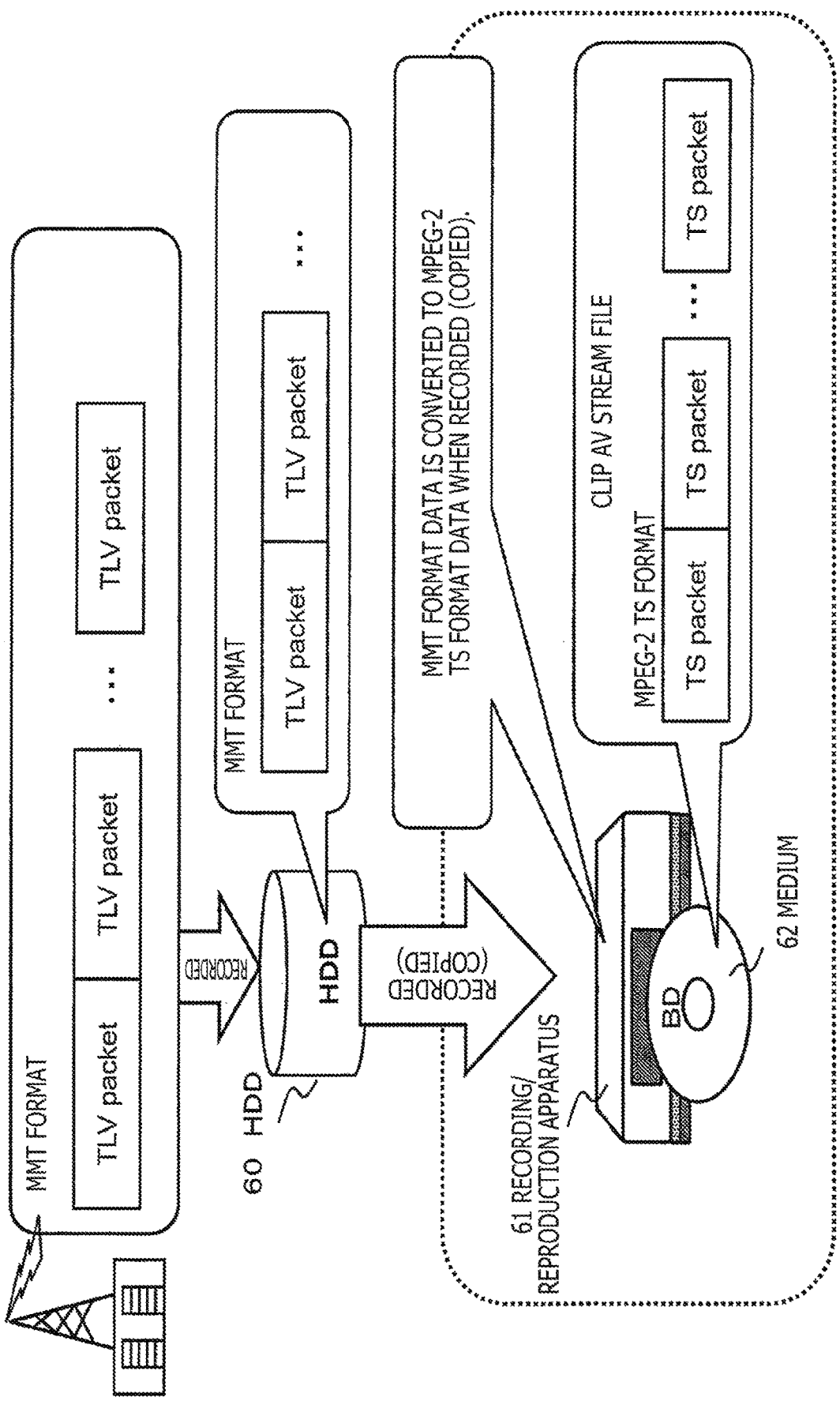
FIG. 10 is an explanatory diagram explaining another example of the process of converting MMT format data to MPEG-2 TS format data for recording onto information recording medium (medium).

Explained below with reference to FIGS. 9 and 10 are examples of the medium-recorded data subject to copy control.

FIG. 9 depicts a recording/reproduction apparatus 61 and medium 62.

The recording/reproduction apparatus 61 converts to MPEG-2 TS format data the MMT format data transmitted typically by the transmission apparatus of a broadcast station or the like, generates a clip AV stream file including a TS packet sequence using the converted data, and records the generated clip AV stream file onto the medium 62.

The data (content) recorded onto the medium 62 is the data subject to copy control. This is the data that needs to be controlled when copied in accordance with the copy control information included in the MMT format data transmitted typically by the transmission apparatus of a broadcast station or the like.

In the example, a BD (Blu-ray (registered trademark) Disc) are used as the medium 62. Alternatively, the medium 62 may be various other recording medium such as a flash memory or an HD (hard disc).

The example depicted in FIG. 9 is one in which MMT format data transmitted typically by the transmission apparatus of a broadcast station or the like and converted to MPEG-2 TS format data is used to generate a clip AV stream file including a TS packet sequence and recorded onto the medium 62. Another example with different settings is depicted in FIG. 10.

FIG. 10 depicts an HDD 60, a recording/reproduction apparatus 61, and a medium 62.

The HDD 60 may be one attached to a TV set, for example.

The HDD 60 attached to the TV set first records the MMT format data unchanged that has been transmitted typically by the transmission apparatus of a broadcast station.

That is, a packet sequence formed with a train of TLV packets storing MMTP packets in compliance with the MMT format is recorded onto the HDD 60.

Thereafter, the recording/reproduction apparatus 61 connected with the TV set reads the recorded data form the HDD 60, i.e., the MMT format data including the TLV packet sequence, converts the MMT format data to MPEG-2 TS format data, generates a clip AV stream file formed with a TS packet sequence using the converted data, and records the generated clip AV stream file onto the medium 62.

The data (content) recorded onto the medium 62 is also subject to copy control. This is the data that needs to be controlled when copied in accordance with the copy control information included in the MMT format data transmitted typically by the transmission apparatus of a broadcast station.

The recording of data from the HDD 60 onto the medium 62 represents a single data copy process. This process also needs to be executed in accordance with the copy control information included in the MMT format data.

Figure 11:
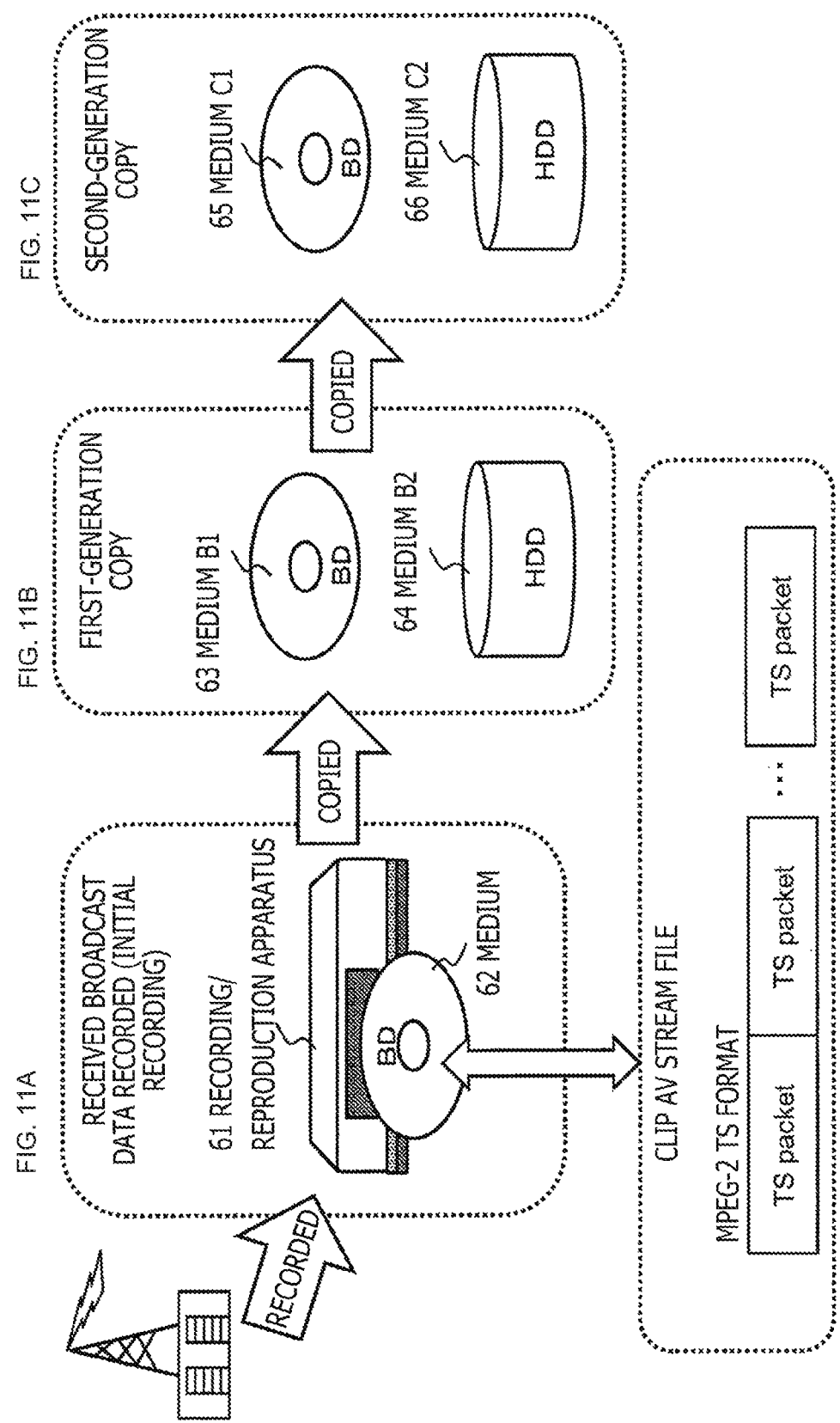
FIGS. 11A, 11B, and 11C are explanatory diagrams explaining a specific example of the process of recording MMT format data onto recording medium before copying the recorded medium to other medium.

Explained below with reference to FIGS. 11A, 11B, and 11C are specific manners in which data is recorded onto medium and subjected to a copying process.

The example depicted in FIGS. 11A, 11B, and 11C were explained above with reference to FIG. 9, i.e., an example in which the MMT format data transmitted typically by the transmission apparatus of a broadcast station or the like is recorded directly onto the medium 62 such as BD by the recording/reproduction apparatus 61.

The recording/reproduction apparatus 61 converts to MPEG-2 TS format data the MMT format data transmitted typically by the transmission apparatus of a broadcast station, generates a clip AV stream file including a TS packet sequence using the converted data, and records the generated clip AV stream file onto the medium 62.

FIGS. 11A, 11B, and 11C depict the following three processes:

FIG. 11A Initial recording of received broadcast data;
FIG. 11B First-generation copy; and
FIG. 11C Second-generation copy.

FIG. 11A The initial recording of received broadcast data involves inputting the data received from the transmission apparatus of a broadcast station into the recording/reproduction apparatus 61 and having the input data recorded thereby onto the medium 62.

Recorded onto the medium 62 is BDAV format data (see FIG. 4) including clip AV stream files each having a TS packet sequence, or SPAV format data (see FIG. 8).

Whereas what is explained below are examples of the processes of recording, reproducing, and copying MMT format data as BDAV format data as mentioned above, the ensuing embodiment can also be applied to the processes of recording, reproducing, and copying MMT format data as SPAV format data.

The clip AV stream file constituting the BDAV format data to be recorded onto the medium 62 is a clip AV stream file including a TS packet sequence.

The recording/reproduction apparatus 61 may copy the data recorded on the medium 62 to other medium.

As depicted in FIG. 11B, the copying process generates medium B1, 63 and B2, 64 or the like that have first-generation copy data recorded thereon.

Also, the recording/reproduction apparatus 61 or some other recording/reproduction apparatus may copy the first-generation copy data recorded on the medium B1, 63 and B2, 64 or the like to other medium.

As depicted in FIG. 11C, the copying process generates medium C1, 65 and C2, 66 or the like that have second-generation copy data recorded thereon.

Although the drawings depict only the first-generation and second-generation copies, it is possible to generate a third-generation copy and a fourth-generation copy, as well as further copies of more generations to come.

However, as discussed above, a large portion of the broadcast content is protected by copyright, with diverse copy control information set in units of the broadcast content such as in terms of individual TV programs.

For example, varieties of copy control information are set to each unit of the content (programs) in such a manner that there exist copy-permitted content, copy-prohibited content, and the content of which the permitted number of times a copy is made or the number of copies allowed to be made is predetermined.

Such copy control information regarding the broadcast content is stored in packets (TLV packet/MMTP packet) when transmitted by broadcast waves together with the program content to the reception apparatus on the user's side.

[5. Copy Control Information Set in MMT Format Data]

Explained next is the copy control information set in the MMT format data delivered by the transmission apparatus of a broadcast station or the like.

Explained below with reference to FIG. 12 and subsequent drawings are the program content and copy control information transmitted typically from a broadcast station or the like in compliance with the MMT format.

Figure 12:
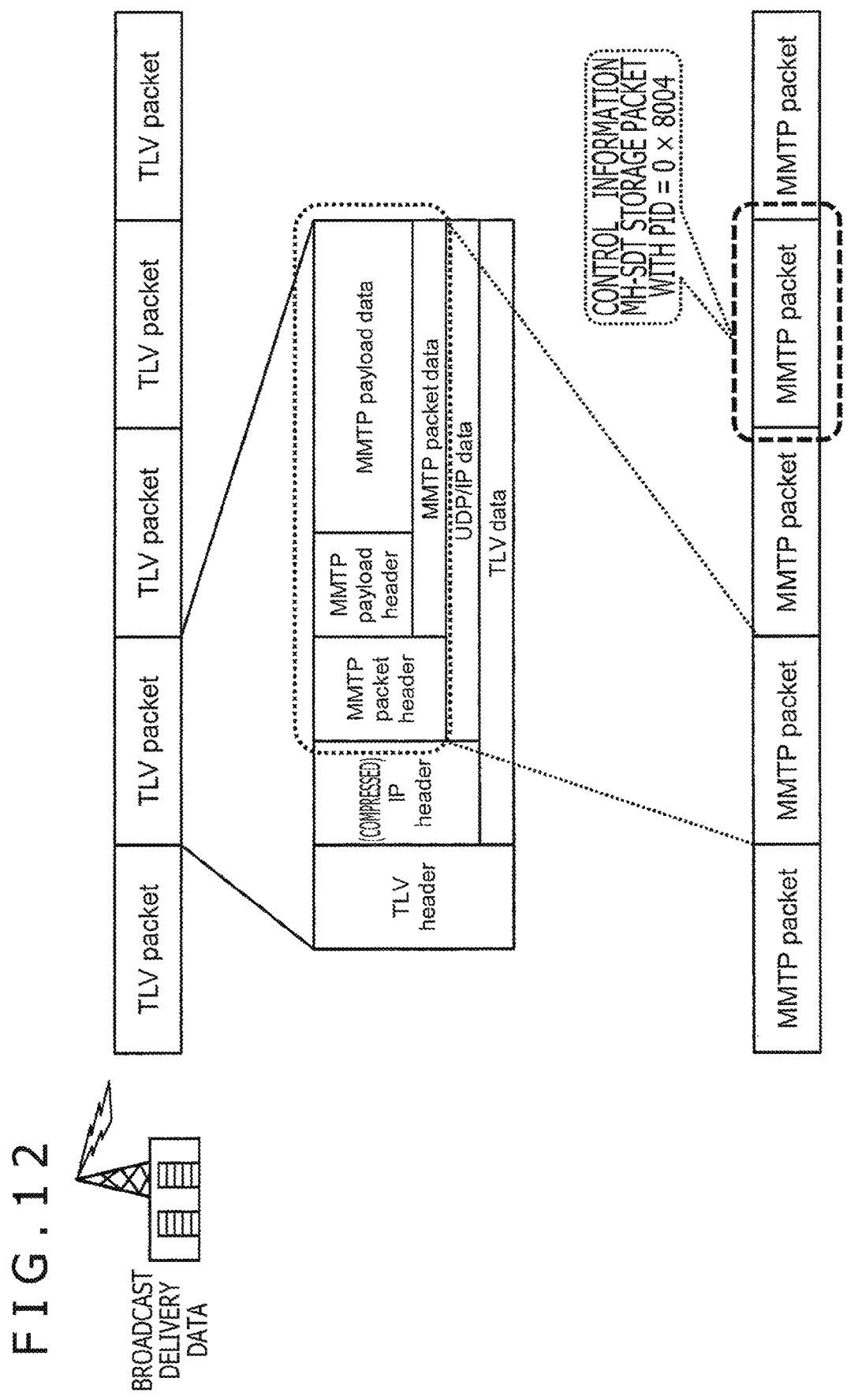

FIG. 12 depicts a sequence of TLV packets transmitted typically by the transmission apparatus of a broadcast station or the like in compliance with the MMT format, the configuration of a TLV packet, and a sequence of MMTP packets extracted from each of the TLV packets and arrayed as illustrated.

The MMTP packets included in the MMTP packet sequence are each configured with the reproduction target data such as video, audio, and subtitle data and the control information (SI: Signaling Information) stored by data type.

The type of data stored in each MMTP packet is identified by a packet ID (PID) recorded in the header of the MMTP packet.

For example, the copy control information is recorded in a service description table (MH-SDT), which is a control information recording table stipulated by the MMT format.

The MMT format prescribes diverse control information recording tables corresponding to the different types of recorded control data. Specifically, the following tables are provided, for example.

(a) TLV-NIT (Network information table)
(b) MH-BIT (Broadcaster information table)
(c) MH-SDT (Service description table)
(d) MH-EIT (Event information table)
(e) MH-TOT (Time offset table)
(f) MPT (MMT package table)

The service description table (MH-SDT) is one type of control information recording table. This table records channel-related information such as channel names and broadcaster names, for example.

The copy control information is recorded in this service description table (MH-SDT).

As depicted in FIG. 12, an MMTP packet that stores the service description table (MH-SDT) has a packet ID (PID)= 0×8004 recorded in the packet.

The apparatus on the user's side extracts the service description table (MH-SDT) from the packet set with PID=0×8004, and acquires the copy control information from the data described therein.

As depicted in FIG. 13, the MMTP packet storing the service description table (MH-SDT) therein is transmitted at intervals of a few seconds. The copy control information stored in a given MH-SDT storage packet is applied to the content stored in the subsequent reproduction target data storage packets.

For example, a control information storage packet 71 storing the service description table (MH-SDT) as depicted in FIG. 13 is used as the copy control information regarding the content such as video, audio and subtitle data stored in the subsequent MMTP packets over a time period up to the next control information storage packet 72.

The control information storage packet 72 is used as the copy control information regarding the content stored in the subsequent MMTP packets over a time period up to the next control information storage packet 73.

In this manner, the copy control information regarding the content stored in MMTP packets is verified by referring to the service description table (MH-SDT) stored in the control information storage packet.

Explained next with reference to FIG. 14 and subsequent drawings is a specific data configuration in the service description table (MH-SDT).

FIG. 14 depicts the data configuration (syntax) of the service description table (MH-SDT) stored in the MMTP packet.

The data configuration (Syntax) is juxtaposed with bit counts (No. of bits) and data representations (Mnemonic) in the table.

In the data representations, a mnemonic "uimsbf" stands for "unsigned integer most significant bit first."

A mnemonic "bslbf" stands for "bit string, left bit first."

The control information regarding MMT format data is recorded in multiple tables in keeping with the types (categories) of the control information. As mentioned above, the following tables are provided, for example.

(a) TLV-NIT (Network information table)
(b) MH-BIT (Broadcaster information table)
(c) MH-SDT (Service description table)
(d) MH-EIT (Event information table)
(e) MH-TOT (Time offset table)
(f) MPT (MMT package table)

In these tables, hierarchically lower-order, subdivided items of the control information in specific categories are recorded in units of descriptors.

In the descriptor recording area of the service description table (MH-SDT) in FIG. 14, the following descriptors are recorded:

(1) Content copy control descriptor; and
(2) Content usage control descriptor.

The above data items may be recorded by predetermined content category such as in units of programs.

Specific data configurations of the two descriptors above are explained below with reference to FIGS. 15 and 16.

Explained first with reference to FIG. 15 is the data configuration (Syntax) of "(1) Content copy control descriptor" above.

In the content copy control descriptor depicted in FIG. 15, the following data items are recorded as illustrated, for example Descriptor tag (descriptor_tag)
Digital recording control information (digital_recording_control_data)
Component control flag (component_control_flag)

In the descriptor tag (descriptor_tag), an identification tag (0×8038) indicating that this descriptor is the content copy control descriptor is recorded.

In the digital recording control information (digital_recording_control_data), a value indicating whether or not a copying process can be performed for digital recording is recorded.

Specific examples will be discussed later with reference to FIG. 17.

In the component control flag (component_control_flag), a value indicating whether or not this descriptor (content copy control descriptor) is valid is recorded. For example, the following one bit is recorded.

0=valid
1=invalid

Explained next with reference to FIG. 16 is the data configuration (Syntax) of "content usage control descriptor," which is another descriptor recorded in the service description table (MH-SDT) depicted in FIG. 14.

As illustrated in FIG. 16, the following data items, for example, are recorded in the "content usage control descriptor."

Copy restriction mode information (copy_restriction_mode)
Encryption mode information (encryption_mode)

Recorded in the copy restriction mode information (copy_restriction_mode) is a data item indicating whether or not there exist restrictions on the number of copies that can be made. For example, the following data item is recorded:

1=number of copies restricted; or
0=number of copies unrestricted.

Recorded in the encryption mode information (encryption_mode) is a data item indicating whether or not the output data subject to a copying process is required to be output as encrypted data. For example, the following data item is recorded:

0=output data encryption required; or
1=output data encryption not required.

As explained above with reference to FIGS. 15 and 16, the service description table (MH-SDT) in FIG. 14 has the following three items of copy control-related information recorded therein.

(A) Digital recording control information (digital_recording_control_data)
(B) Encryption mode information (encryption_mode)
(c) Copy restriction mode information (copy_restriction_mode)

FIG. 17 is a tabular diagram that lists different modes (5 modes) of digital copy control and the settings of three types of control information stipulated by the MMT format.

The following five modes of digital copy control are listed in FIG. 17.

(1) Mode in which copy is permitted without restriction, with copy output data required to be encrypted
(2) Mode in which copy is permitted without restriction, with copy output data not required to be encrypted
(3) Mode in which copy is prohibited
(4) Mode in which copy is permitted for one generation only, with the number of copies restricted
(5) Mode in which copy is permitted for one generation only, with the number of copies unrestricted For each of the above-listed five modes of digital copy control, the settings of the three types of control information stipulated by the above-described MMT format are given in FIG. 17 as follows.

(1) For the mode in which copy is permitted without restriction, with the copy output data required to be encrypted
(A) 00=digital recording control information (copy permitted without restriction, digital recording permitted)
(B) 0=encryption mode information (copy output data required to be encrypted)
(C) Don't care=copy restriction mode information (no provision)

(2) For the mode in which copy is permitted without restriction, with copy output data not required to be encrypted
(A) 00=digital recording control information (copy permitted without restriction, digital recording permitted)
(B) 1=encryption mode information (copy output data not required to be encrypted)
(C) Don't care=Copy restriction mode information (no provision)

(3) For the mode in which copy is prohibited
(A) 11=digital recording control information (copy prohibited, digital recording prohibited)
(B) Don't care=encryption mode information (no provision)
(C) Don't care=copy restriction mode information (no provision)

(4) For the mode in which copy is permitted for one generation only, with the number of copies restricted
(A) 10=digital recording control information (copy and digital recording permitted for one generation only)
(B) 0=encryption mode information (copy output data required to be encrypted)
(C) 1=copy restriction mode information (number of copies restricted)

(5) For the mode in which copy is permitted for one generation only, with the number of copies unrestricted
(A) 10=digital recording control information (copy and recording permitted for one generation only)
(B) 0=encryption mode information (copy output data required to be encrypted)
(C) 0=copy restriction mode information (number of copies unrestricted)

The five digital copy control modes (1) to (5) listed in FIG. 17 are subject to the following three types of control information stipulated by the MMT format:

(A) Digital recording control information (digital_recording_control_data);
(B) Encryption mode information (encryption_mode); and
(C) Copy restriction mode information (copy_restriction_mode).

Each of these record data has the above-described settings as depicted in FIG. 17.

[6. Process of Recording the Copy Control Information in the Case where MMT Format Data is Converted to MPEG-2 TS Format Data when Recorded]

Explained below is the process of recording the copy control information in the case where MMT format data is converted to MPEG-2 TS format data when recorded.

As discussed above with reference to FIGS. 14 to 17, the MMT format data transmitted typically by the transmission apparatus of a broadcast station or the like is furnished with the copy control information regarding the transmitted content, i.e., reproduction target data typically including video, audio, and subtitle data.

The copy control information included in the MMT format data is recorded in the service description table (MH-SDT) stored in the MMTP packet stipulated by the MMT format, i.e., recorded in the table depicted in FIG. 14.

As explained above with reference to FIGS. 9, 10, 11A, 11B, and 11C, the recording/reproduction apparatus 61 converts to MPEG-2 TS format data the MMT format data transmitted typically by the transmission apparatus of a broadcast station or the like, generates a clip AV stream file including a TS packet sequence using the converted data, and records the generated clip AV stream file onto the medium 62.

According to the configurations of the present disclosure, the recording/reproduction apparatus 61 carrying out the format conversion process reads the copy control information from the service description table (MH-SDT) stored in the MMTP packet, and records the copy control information to the TS packet stipulated by the MPEG-2 TS format.

The above processing makes it possible also to place the data recorded onto the medium 62 under the copy control scheme in compliance with the copy control information prescribed for broadcast waves.

Explained below is the processing performed by the information processing apparatus of the present disclosure, i.e., the process of recording the copy control information in the case where MMT format data is converted to MPEG-2 TS format data when recorded.

The reproduction apparatus that converts MMT format data to MPEG-2 TS format data, generates a clip AV stream file including a TS packet sequence using the converted data, and records the generated clip AV stream file onto medium, such as the recording/reproduction apparatus 61 explained above with reference to FIGS. 9 and 10, reads the copy control information from inside the service description table (MH-SDT) stored in the MMTP packet, and records the retrieved copy control information to the TS packet stipulated by the MPEG-2 TS format.

From the service description table (MH-SDT) stored in the MMTP packet stipulated by the MMT format and explained above with reference to FIGS. 14 to 17, the recording/reproduction apparatus 61 reads the following items of information:

Content copy control descriptor; and
Content usage control descriptor.

The recording/reproduction apparatus 61 records the above information items to the program map table (PMT), i.e., a control information recording table stipulated by the MPEG-2 TS format, stores into a TS packet the PMT with the copy control information recorded therein, and records the TS packet onto medium.

The program map table (PMT), which is a control information recording table stipulated by the MPEG-2 TS format, is stored into a TS packet. The TS packet with the PMT stored therein is placed into a clip AV stream file along with TS packets having the reproduction target data such as video, audio and subtitle data stored therein, the clip AV stream file being stipulated by the BDAV format.

The program map table (PMT) stipulated by the MPEG-2 TS format is explained below with reference to FIG. 18. FIG. 18 depicts the data configuration (syntax) of the program map table (PMT).

As illustrated in FIG. 18, the program map table (PMT) is stored into a TS packet that constitutes part of the clip AV stream file.

A copy status descriptor (copy_status_descriptor) 81 is recorded as one of the descriptors in the program map table (PMT).

FIG. 19 depicts the data configuration (syntax) of the copy status descriptor (copy_status_descriptor) 81.

The copy status descriptor (copy_status_descriptor) includes the following data items.

Descriptor tag (descriptor_tag)=descriptor identifier
Descriptor length (descriptor_length)=descriptor byte count
CA system ID (CA_System_ID)=identifier identifying the applicable target
Private data byte (private_data_byte)=private data recording area Of the data items listed above, the private data byte (private_data_byte) constituting a private data recording area is allowed to record diverse data.
Recorded in this private data recording area is the copy control information recorded in the service description table (MH-SDT) in the MMT format data received typically by broadcast waves or the like. That is, the information to be recorded in this area is the data that inherits the following data items explained above with reference to FIGS. 14 to 17:

Content copy control descriptor; and
Content usage control descriptor.

A data configuration example of the private data recording area is explained below with reference to FIG. 20 and subsequent drawings.

The following data items are recorded in the private data recording area as depicted in FIG. 20.

Retention move mode (Retention_Move_Mode)
Retention state (Retention_State)
EPN=copy output data encryption necessity information
CCI=copy restriction information
These data items may be recorded by predetermined content category such as in units of programs.

Two of the above items, i.e., retention move mode (Retention_Move_Mode) and retention state (Retention state), constitute information regarding a data copy permission period. These two data items are not used in the processing addressed by the present disclosure.

The area named EPN, which stands for encryption plus non-asserted, is an area in which to record information as to whether or not the data recorded on medium is required to be encrypted when output and copied (digital output).

The area named CCI, which stands for copy control information, is an area in which to record information as to whether or not a copying process is permitted and information as to allowed copy count.

The EPN and CCI areas are explained below in detail with reference to FIG. 21.

The EPN area is an area in which to record information as to whether or not copy output data is required to be encrypted. This area accommodates one-bit data of either 0 or 1. The recorded bit value 0 or 1 has the following meaning.

(1) Bit value 0: copy output data (digital data) is required to be encrypted (EPN-asserted)
(2) Bit value 1: copy output data (digital data) is not required to be encrypted (EPN-unasserted)

The CCI area is an area in which to record the copy restriction information. This area accommodates two-bit data of 00 through 11. The recorded bit values 00 through 11 have the following meanings.

(1) Bit value 00: there is no copy restriction (Copy Control Not Asserted)
(2) Bit value 01: copying of the next generation is prohibited (No More Copy)
(3) Bit value 10: copying of one generation only is permitted (Copy One Generation)
(4) Bit value 11: copying is prohibited (Never Copy)

The program map table (PMT) stipulated by the MPEG-2 TS format prescribes that the copy control information items of the above-mentioned EPN and CCI areas be recorded. For example, in the case where a copying process is to be performed using a data processing application supporting the MPEG-2 TS format, copy control is executed in accordance with the settings of the copy control information (EPN, CCI) recorded in the PMT.

Thus, the information processing apparatus that converts MMT format data to the MPEG-2 TS format for recording, such as the recording/reproduction apparatus 61 explained above with reference to FIGS. 9 and 10, performs the following processing.

First, the recording/reproduction apparatus 61 acquires the service description table (MH-SDT) from the MMT format data that is input typically by broadcast waves or the like.

The recording/reproduction apparatus 61 further reads the settings of the copy control information recorded in the service description table (MH-SDT).

On the basis of the retrieved settings, the recording/reproduction apparatus 61 determines the settings of the copy control information (EPN, CCI) and records the determined settings to the program map table (PMT) stipulated by the MPEG-2 TS format.

The above processing, when carried out, allows the copy control information complying with the initial MMT format data prescribed typically by broadcast waves to be inherited for application to the MPEG-2 TS format data recorded on medium.

As discussed above with reference to FIGS. 14 to 17, the copy control information recorded in the service description table (MH-SDT) complying with the MMT format has the following information items:

Content copy control descriptor; and

Content usage control descriptor.

Meanwhile, as explained above with reference to FIGS. 18 to 21, the copy control information recorded in the program map table (PMT) complying with the MPEG-2 TS format has the following information items:

EPN=copy output data encryption necessity information; and

CCI=copy restriction information.

The apparatus that converts MMT format data to MPEG-2 TS format data for recording onto medium is required to convert the copy control information in the MMT format, i.e., the following information items recorded in the service description table (MH-SDT):

Content copy control descriptor; and

Content usage control descriptor;

into the following items of the copy control information in the MPEG-2 TS format:

EPN=copy output data encryption necessity information; and

CCI=copy restriction information;

which are recorded in the program map table (PMT).

This requires defining the rules for converting the copy control information complying with the MMT format to the copy control information complying with the MPEG-2 TS format and carrying out the conversion in accordance with the defined conversion rules.

Exemplary conversion rules are explained below with reference to FIG. 22.

The apparatus that converts MMT format data to MPEG-2 TS format data for recording onto medium, for example, in accordance with the conversion rules depicted in FIG. 22, converts the copy control information in the MMT format, i.e., the copy control information items recorded in the service description table (MH-SDT), into the copy control information in the MPEG-2 TS format, i.e., into the copy control information items to be recorded in the program map table (PMT) for recording onto medium.

Incidentally, the copy control information may be set by predetermined content category such as in units of programs in the MMT format as well as in the MPEG-2 TS format. The conversion process is also carried out by predetermined content category such as in units of programs.

The conversion rules listed in FIG. 22 are explained below.

The conversion rules in FIG. 22 prescribe which settings of the copy control information recorded in the service description table (MH-SDT) stipulated by the MMT format provide the basis for determining the following two settings of the copy control information and for recording the determined settings to the program map table (PMT) stipulated by the MPEG-2 TS format:

EPN (0, 1), which is one-bit data constituting the copy output data encryption necessity information; and CCI (00-11), which is two-bit data constituting the copy restriction information.

FIG. 22 indicates the following two items.

(a) Copy output data encryption necessity information (EPN correspondence information)

(b) At least either copy permission/prohibition information or allowed copy count information (CCI correspondence information)

(a) The copy output data encryption necessity information (EPN correspondence information) corresponds to the EPN prescribed as the copy control information to be recorded in the program map table (PMT) stipulated by the MPEG-2 TS format.

(b) At least either the copy permission/prohibition information or the allowed copy count information (CCI correspondence information) corresponds to the CCI prescribed as the copy control information to be recorded in the program map table (PMT) stipulated by the MPEG-2 TS format.

Explained first is the copy output data encryption necessity information (EPN correspondence information) in paragraph (a) above.

The EPN correspondence information corresponds to the encryption mode information (encryption_mode) in the copy control information items recorded in the service description table (MH-SDT) stipulated by the MMT format.

As discussed above with reference to FIG. 17, the encryption mode information (encryption_mode) is one-bit information in the MMT format, the information including either of the following two settings:

0, which signifies that copy output data is required to be encrypted; or 1, which signifies that copy output data is not required to be encrypted.

Meanwhile, as explained above with reference to FIG. 21, the EPN area stipulated by the MPEG-2 TS format is an area in which to record one-bit data representing the copy output data encryption necessity information. The recorded bit value 0 or 1 has the following meaning.

(1) Bit value 0: copy output data (digital data) is required to be encrypted (EPN-asserted)

(2) Bit value 1: copy output data (digital data) is not required to be encrypted (EPN-unasserted)

On the basis of the above-described relations of correspondence, the apparatus that converts MMT format data to MPEG-2 TS format data for recording onto medium converts the setting of 0 of the encryption mode information (encryption_mode) in the MMT format to EPN=0 stipulated by the MPEG-2 TS format.

The apparatus further converts the setting of 1 of the encryption mode information (encryption_mode) in the MMT format to EPN=1 stipulated by the MPEG-2 TS format.

In this manner, the apparatus that converts MMT format data to MPEG-2 TS format data for recording onto medium determines the EPN value to be recorded in the program map table (PMT) stipulated by the MPEG-2 TS format in accordance with the conversion rules discussed above.

Explained next is what is indicated in FIG. 22 as at least either the copy permission/prohibition information or the allowed copy count information (CCI correspondence information).

The CCI correspondence information corresponds to:

Digital recording control information (digital_recording_control_data);

in the copy control information recorded in the service description table (MH-SDT) stipulated by the MMT format.

As explained above with reference to FIG. 17, the digital recording control information (digital_recording_control_data) in the MMT format is two-bit information having the following meanings:

00, which means both copying and digital recording are permitted without restriction;

11, which means both copying and digital recording are prohibited; and 10, which means both copying and digital recording of one generation only are permitted.

Meanwhile, as discussed above with reference to FIG. 21, the CCI area is an area in which to record two-bit data representing the copy restriction information stipulated by the MPEG-2 TS format. The recorded bit values 00, 01, 10, and 11 have the following meanings.

(1) Bit value 00: there is no copy restriction (Copy Control Not Asserted)

(2) Bit value 01: copying of the next generation is prohibited (No More Copy)

(3) Bit value 10: copying of one generation only is permitted (Copy One Generation)

(4) Bit value 11: copying is prohibited (Never Copy)

On the basis of the above-described relations of correspondence, the apparatus that converts MMT format data to MPEG-2 TS format data for recording onto medium converts the setting of 00 of the digital recording control information (digital_recording_control_data) in the MMT format to CCI=00 stipulated by the MPEG-2 TS format.

These settings signify that a copying process is permitted without restriction.

In the case where the digital recording control information (digital_recording_control_data) in the MMT format is set to 11, that means the MMT format data is prohibited to be copied.

Thus, the apparatus that converts MMT format data to MPEG-2 TS format data for recording onto medium stops and desists with the process of converting MMT format data to MPEG-2 TS format data for recording.

The digital recording control information (digital_recording_control_data) being set to 10 in the MMT format signifies that copying of one generation only is permitted.

The above setting corresponds to CCI=01 stipulated by the MPEG-2 TS format. Because the process of converting MMT format data to MPEG-2 TS format data for recording represents a copy one-generation process, the moment the format conversion and recording process is carried out, the allowed copying process is completed.

Thus, in this case, the apparatus that converts MMT format data to MPEG-2 TS format data for recording onto medium records the setting of CCI=11, i.e., the copy prohibition setting (Never Copy) as the CCI value stipulated by the MPEG-2 TS format.

In this manner, the apparatus that converts MMT format data to MPEG-2 TS format data for recording onto medium, for example, in accordance with the conversion rules depicted in FIG. 22, performs the process of recording the copy control information written in the service description table (MH-SDT) in the MMT format to the program map table (PMT) in the MPEG-2 TS format as the copy control information (EPN, CCI) therein.

Executing the above process makes it possible to provide secure copy control on the MPEG-2 TS format data as medium-recorded data following the format conversion process in a manner inheriting the copy control information associated with the initial data, i.e., the MMT format data transmitted typically by the transmission apparatus of a broadcast station or the like.

Configuration and Processing of the Information Processing Apparatus that Executes Process of Recording Data onto Information Recording Medium Explained next with reference to FIG. 23 and subsequent drawings are the configuration of an information processing apparatus and the process performed thereby to input MMT format data received typically from the transmission apparatus of a broadcast station and to record the input data onto information recording medium.

As discussed above, the information processing apparatus of the present disclosure converts the input data in compliance with the MMT format to MPEG-2 TS format data for recording onto information recording medium such as BD, HD, or flash memory.

In this case, the recording format is the BDAV format or the SPAV format, for example.

At the time of the above data recording process, a further process is performed to acquire the copy control information included in the input data in compliance with the MMT format, more specifically the copy control information stored in the service description table (MH-SDT) stored in the MMTP packet, and to record the acquired copy control information to the program map table (PMT) stipulated by the MPEG-2 TS format. Another process is also carried out to record reproduction control information and attribute information or the like corresponding to the MMT format data to database files such as playlist files and clip information files.

The information such as the copy control information, reproduction control information, and attribute information or the like can be acquired for example from the TLV-SI, which is the control information included in the input data in compliance with the MMT format, and from various information recording tables constituting the MMT-SI.

Explained below is the configuration of the information processing apparatus that performs the data recording process on information recording medium such as BD, as well as a processing sequence executed by the information processing apparatus.

FIG. 23 depicts the configuration of an information processing apparatus 400 that executes the data recording process on information recording medium such as BD. The information processing apparatus 400 records clip AV stream files as well as database files such as playlist files and clip information files onto information recording medium (recording medium) 420.

A data input section 401 inputs MMT format data 431, which includes video data, audio data and subtitle data, for recording onto the information recording medium 420.

The data input section 401 includes a reception section that receives the MMT format data 431 transmitted from a broadcast station or from a content server, for example, or a medium reading section that reads the MMT format data 431 from the medium on which the data is recorded.

The MMT format data 431 input through the data input section 401 complies with the data format explained above with reference to FIG. 2, the data including high-definition video data such as HEVC videos, for example.

The MMT format data 431 is stored into a storage section 404 under control of a control section 403.

A user input section 402 inputs, for example, a request to start recording data onto the information recording medium 420.

A data recording start request input through the user input section 402 acts as a trigger to input the MMT format data 431 stored in the storage section 404 to a demultiplexer (DeMUX) 405.

The demultiplexer (DeMUX) 405 acquires from the MMT format data 431 the packets storing video, audio and subtitle data and the auxiliary information such as control information (TLV-SI, MMT-SI) including notification information, reproduction control information and copy control information. The demultiplexer (DeMUX) 405 categories by data type what is thus acquired into categorized packets, and inputs the categorized packets to a subtitle data generation section 411, to a video data generation section 412, to an audio data generation section 413, and to an auxiliary information generation section 414 in a record data generation section 406 in accordance with the data type.

The subtitle data generation section 411 acquires subtitle data from MMT format data 331 that was input through the data input section 401 and stored in the storage section 404, so as to generate stream file storage data stipulated by the BDAV format.

The video data generation section 412 acquires video data from the MMT format data 331 that was input through the data input section 401 and stored in the storage section 404, so as to generate stream file storage data stipulated by the BDAV format.

The audio data generation section 413 acquires audio data from the MMT format data 431 that was input through the data input section 401 and stored in the storage section 404, so as to generate stream file storage data stipulated by the BDAV format.

The auxiliary information generation section 414 acquires the auxiliary information such as the control information (TLV-SI, MMT-SI) including notification information, reproduction control information, and copy control information from the MMT format data 431 that was input through the data input section 401 and stored in the storage section 404, so as to generate data to be stored into clip AV stream files as well as into playlist files and clip information files constituting database files stipulated by the BDAV format.

The auxiliary information generation section 414 further performs the process of acquiring the copy control information recorded in the service description table (MH-SDT) included in the MMT format data, so as to record the acquired copy control information to the program map table (PMT) stipulated by the MPEG-2 TS format.

The above process is carried out in accordance with the conversion rules explained above with reference to FIG. 22.

The multiplexer (MUX) 415 inputs the subtitle, video, and audio data obtained through conversion by the subtitle data generation section 411, video data generation section 412, and audio data generation section 413 respectively, and diverse information obtained by the auxiliary information generation section 414 from the control information (TLV-SI, MMT-SI) in the MMT format data 331, so as to generate stream files (clip AV stream files) that store such data.

Incidentally, the stream files (clip AV stream files) include the program map table (PMT) in which the copy control information is recorded in compliance with the MPEG-2 TS format.

A database file generation section 416 generates database files such as playlist files and clip information files that store diverse information acquired by the auxiliary information generation section 414 from the control information (TLV-SI, MMT-SI) in the MMT format data 431.

Record data 432 including the stream file data generated by the record data generation section 406 and the database files such as playlist files and clip information files are output under control of the control section 403 by a recording section 406 to the information recording medium 420 for recording thereto via a drive 407.

Figure 24:
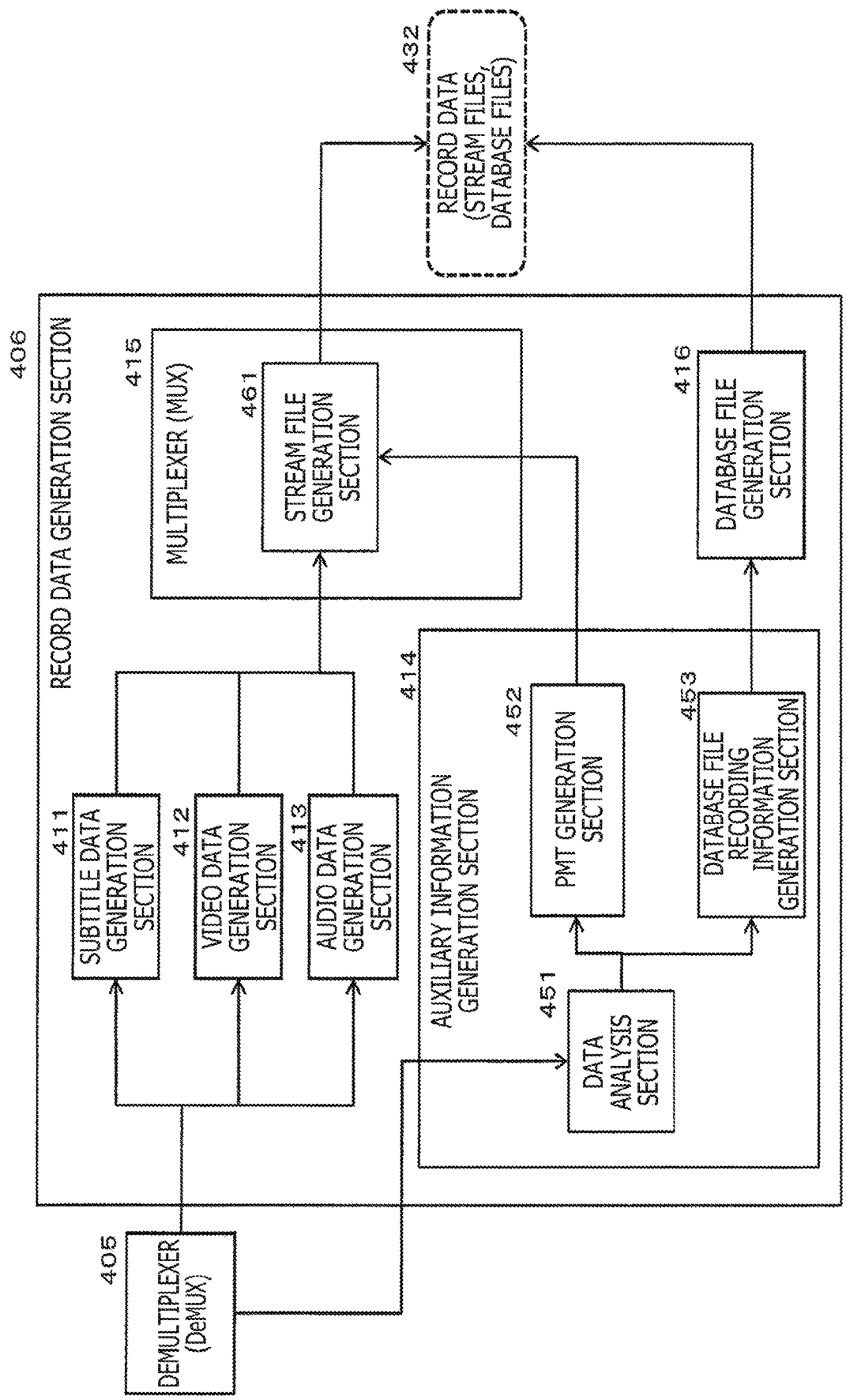
FIG. 24 is an explanatory diagram explaining another exemplary configuration of the information processing apparatus that executes the process of recording data onto information recording medium (medium).

Explained next with reference to FIG. 24 is an exemplary configuration of the auxiliary information generation section 414 that performs the process of generating the program map table (PMT) to which the copy control information is recorded by the information processing apparatus 400 depicted in FIG. 23.

As depicted in FIG. 24, the record data generation section 406 includes the subtitle data generation section 411, video data generation section 412, audio data generation section 413, auxiliary information generation section 414, multiplexer (MUX) 415, and database file generation section 416.

The auxiliary information generation section 414 includes a data analysis section 451, a program map table (PMT) generation section 452, and a database file recording information generation section 453.

The data analysis section 451 analyzes the data demultiplexed by the demultiplexer (DeMUX) 405 so as to acquire the data used for generating the copy control information for recording onto the information recording medium (recording medium) 420 and the data for recording to playlist files and clip information files.

The data used for generating the copy control information is output to the program map table (PMT) generation section 452. The data used for generating the playlist files and clip information files is output to the database file recording information generation section 453.

The program map table (PMT) generation section 452 generates a program map table (PMT) in which the copy control information is recorded.

As explained above, this process is carried out in accordance with the conversion rules listed in FIG. 22 to record the copy control information written in the service description table (MH-SDT) in the MMT format to the program map table (PMT) in the MPEG-2 TS format as the copy control information (EPN, CCI).

The database file recording information generation section 453 generates the data to be recorded to playlist files and clip information files and outputs the data to the database file generation section 416.

Using the data generated by the database file recording information generation section 453, the database file generation section 416 generates playlist files and clip information files.

The program map table (PMT) generated by the program map table (PMT) generation section 452 in the auxiliary information generation section 414 is input to a stream file generation section 461 in the multiplexer (MUX) 415.

The record data generated by the subtitle data generation section 411, video data generation section 412, and audio data generation section 413 are also input to the stream file generation section 461 in the multiplexer (MUX) 415.

The stream file generation section 461 in the multiplexer (MUX) 415 generates stream files (clip AV stream files) having TS packets individually storing the video data, audio data, subtitle data, and the PMT in which the copy control information is stored.

The stream files and database files generated as described above are output to the recording section 407 as the record data 432 to be recorded onto the information recording medium (recording medium) 420.

Explained below with reference to the flowchart in FIG. 25 is the sequence of the data recording process performed on the information recording medium 420 by the information processing apparatus 400 discussed above with reference to FIGS. 23 and 24.

The process in accordance with the flow depicted in FIG. 25 may be carried out under control of a data processing section (control section) equipped with a CPU capable of program execution in keeping with programs stored in the storage section of the information processing apparatus, for example.

Each of the steps making up the flow of FIG. 25 is explained below in sequence.

(Step S101)

First in step S101, the information processing apparatus 400 inputs via the data input section 401 MMT format data as record data to be recorded.

The record data includes video data, audio data, subtitle data, and the control information (TLV-SI, MMT-SI) including notification information and diverse control information.

The copy control information recorded in the service description table (MH-SDT) in the MMT format is also included as part of the control information.

(Step S102)

In step S102, the information processing apparatus 400 performs a demultiplexing process on the input MMT format data, i.e., the process of separating the data by data type. The demultiplexing process provides video data, audio data, subtitle data, and control information, for example.

(Step S103)

In step S103, the information processing apparatus 400 stores into memory the control information separated in step S102, such as the control information (TLV-SI, MMT-SI).

The control information includes the copy control information recorded in the service description table (MH-SDT) in the MMT format.

(Step S104)

In step S104, the information processing apparatus 400 performs the process of reading the copy control information stored into memory in step S103 from the service description table (MH-SDT) in the MMT format, before recording the copy control information to the program map table (PMT) stipulated by the MPEG-2 TS format.

This process is carried out in accordance with the conversion rules explained above with reference to FIG. 22.

In the program map table (PMT) recorded on the information recording medium (recording medium) 420, the following information is stored:

EPN=copy output data encryption necessity information; and

CCI=copy restriction information.

The above settings are determined, as discussed above with reference to FIG. 22, on the basis of the following values:

Encryption mode information (encryption_mode); and

Digital recoding control information (digital_recording_control_data);

included in the copy control information recorded in the service description table (MH-SDT) stipulated by the MMT format. The process of updating the copy control information is also carried out as needed. The updating process involves making an update from CCI=01 to CCI=11 discussed above with reference to FIG. 22.

(Step S105)

In step S105, the information processing apparatus 400 generates stream files having a TS packet sequence including the program map table (PMT) generated in step S104.

(Step S106)

In step S106, the information processing apparatus 400 generates clip information files using the input configuration data in the MMT format.

That is, the information processing apparatus 400 generates the clip information files corresponding to the clip AV stream files holding the MMT format data.

(Step S107)

In step S107, the information processing apparatus 400 generates playlist files using the input configuration data in the MMT format.

That is, the information processing apparatus 400 generates the playlist files corresponding to the clip AV stream files holding the MMT format data.

(Step S108)

In step S108, the information processing apparatus 400 generates other database files using the input MMT format data.

(Step S109)

In step S109, the information processing apparatus 400 generates BDAV format data using the generated AV stream files and database files.

(Step S110)

In step S110, the information processing apparatus 400 records the BDAV format data generated in step S109 onto information recording medium (medium).

[8. Configuration and Processing of Information Processing Apparatus that Executes Process of Copying Data Between Information Recording Medium]

Explained below with reference to FIG. 26 and subsequent drawings are the configuration of an information processing apparatus and the process performed thereby to copy data between information recording medium.

Figure 26:
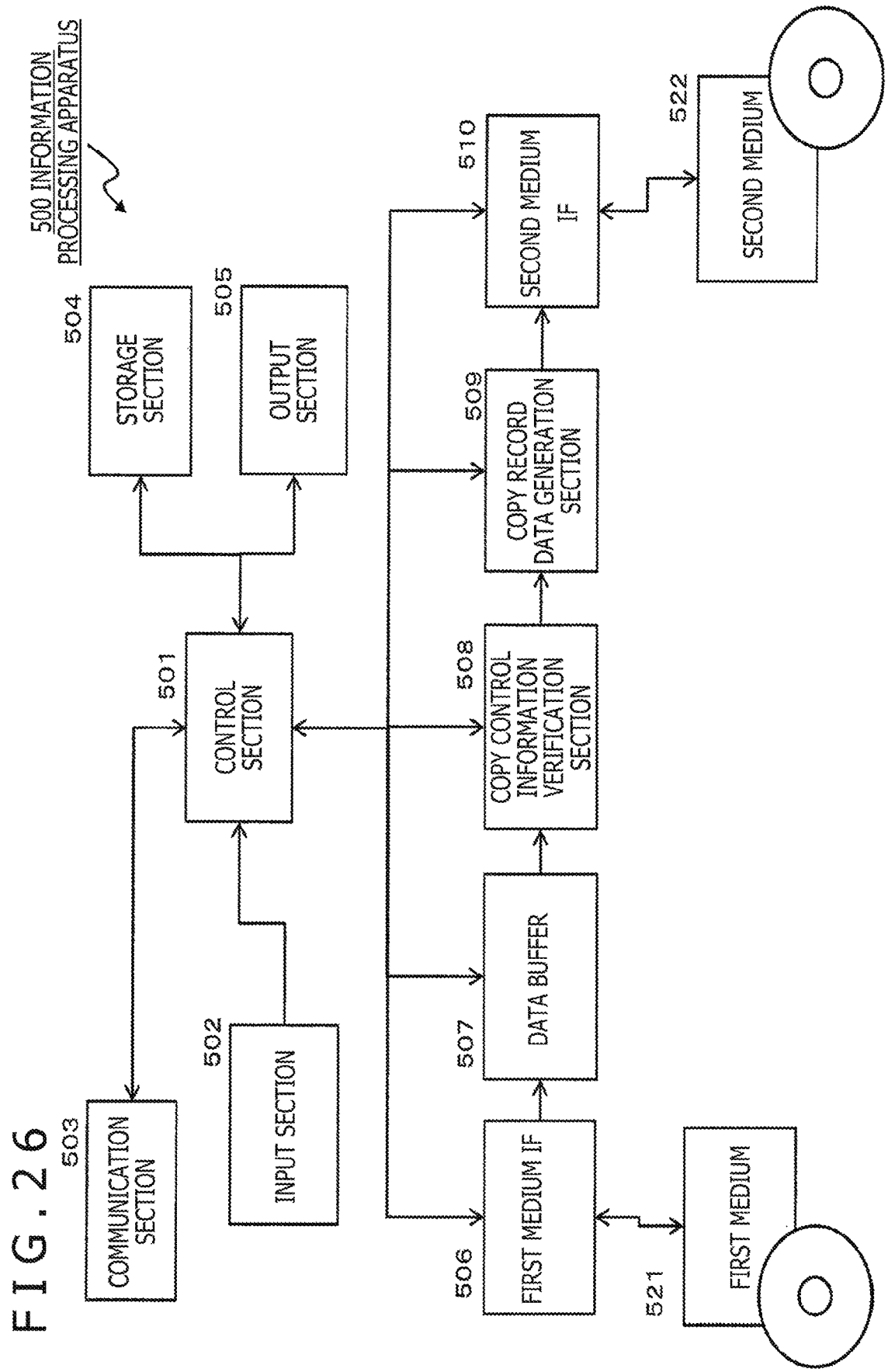
FIG. 26 is an explanatory diagram explaining an exemplary configuration of an information processing apparatus that executes the process of copying data between information recording medium (medium).

An information processing apparatus 500 depicted in FIG. 26 is an apparatus that copies the data recorded on first medium 521 to second medium 522 for recording thereon.

The information processing apparatus 500 performs a so-called copying process of reading recorded data from the first medium 521, i.e., information recording medium such as a BD (Blu-ray (registered trademark) Disc), and recording the read data onto the second medium 522.

Alternatively, the information processing apparatus 500 performs a copying process of recording medium-recorded data input through a communication section 503 onto the second medium 522.

As depicted in FIG. 26, the information processing apparatus 500 includes a control section 501, an input section 502, a communication section 503, a storage section 504, an output section 505, a first medium interface (IF) 506, a data buffer 507, a copy control information verification section 508, a copy record data generation section 509, and a second medium interface (IF) 510.

The control section 501 controls data processing performed by the information processing apparatus 500, the processing including the process of recording and reproducing data using medium and the process of copying data between medium. Such controls are executed in accordance with programs stored in the storage section 504 for example.

The input section 502 includes switches, buttons, and a touch panel or the like that can be operated by the user. The input section 502 is a section through which instructions to perform various processes such as reproduction, copy, and recording are input.

Alternatively, the input section 502 may be configured with an imaging section and a microphone for acquiring input of video and audio data for recording onto medium.

The communication section 503 communicates with external servers or external devices, for example. The communication section 503 is thus used in diverse communication processes including acquisition of record data for recording onto medium, acquisition of control information regarding the record data, and acquisition of copying process permission information.

The storage section 504 is used as a storage area that accommodates programs to be executed by the control section 501 and parameters for use in program execution, and also as a work area for use at the time of the program execution.

Specifically, the storage section 504 is used as an area that temporarily stores the data read from the first medium 521 for recording onto the second medium 522 or the data input through the communication section 503.

The storage section 504 is configured with a RAM or a ROM, for example.

The output section 505 is configured with an output part for outputting data to an external apparatus and an output part for outputting reproduced data coming from medium. For example, the output section 505 includes a display device and speakers used to display the state of progress on the process of recording data onto the second medium 522 and also used to display messages destined for the user.

By gaining access to the first medium 521 such as a BD (Blu-ray (registered trademark) Disc), the first medium interface (IF) 506 functions as a data recording/reproduction section that records and reads data to and from the first medium 521.

The data buffer 507 temporarily stores the data read from the first medium 521 or the data input through the communication section 503. For example, the data buffer 507 temporarily holds the data to be recorded onto the second medium 522.

The copy control information verification section 508 performs the process of verifying the copy control information to be referenced during the process of copying recorded data from the first medium 521.

The copy control information verification section 508 acquires the TS packet that has the program map table (PMT) stored therein from the packets (TS packets) constituting stream files, and reads the copy control information recorded in the program map table (PMT).

The copy control information above is recorded on the basis of the copy control information written to the service description table (MH-SDT) in the initial MMT format in accordance with the conversion rules explained above with reference to FIG. 22.

THE copy control information verification section 508 determines whether or not a copying process is permitted by referring to the copy control information recorded in the program map table (PMT).

If the copying process is determined to be not permitted, data is not copied. If the copying process is determined to be permitted, data is copied.

Incidentally, the copy control information is recorded in the program map table (PMT) in units of content such as in terms of individual programs. Whether or not copying is permitted may be determined in units of content.

The copy record data generation section 509 generates copy record data out of the data on which the copying process is determined to be permitted by the copy control information verification section 508.

Incidentally, the process of generating the copy record data includes the process of conversion to the format corresponding to the second medium 522 and the process of encryption, for example.

By gaining access to the second medium 522, the second medium interface (IF) 510 functions as a data recording/reproduction section that records or reads data to or from the second medium 522.

In this manner, the information processing apparatus 500 performs the process of recording onto the second medium 522 the data that is read from the first medium 521 or input through the communication section 503.

At the time of the processing, the information processing apparatus 500 references the program map table (PMT) to determine whether or not a copying process is permitted. If permitted, the copying process is performed in compliance with the control information recorded in the copy control information.

If the copy control information is required to be updated following execution of the copying process, the information processing apparatus 500 performs the process of updating the copy control information and records the updated copy control information associated with the second medium 522.

Alternatively, the information processing apparatus 500 may be configured to acquire, from an external server via the communication section 503, information regarding permission to perform the process of copying from the first medium 521 to the second medium 522. The information processing apparatus 500 is allowed to carry out the copying process on condition that the permission information is acquired.

Figure 27:
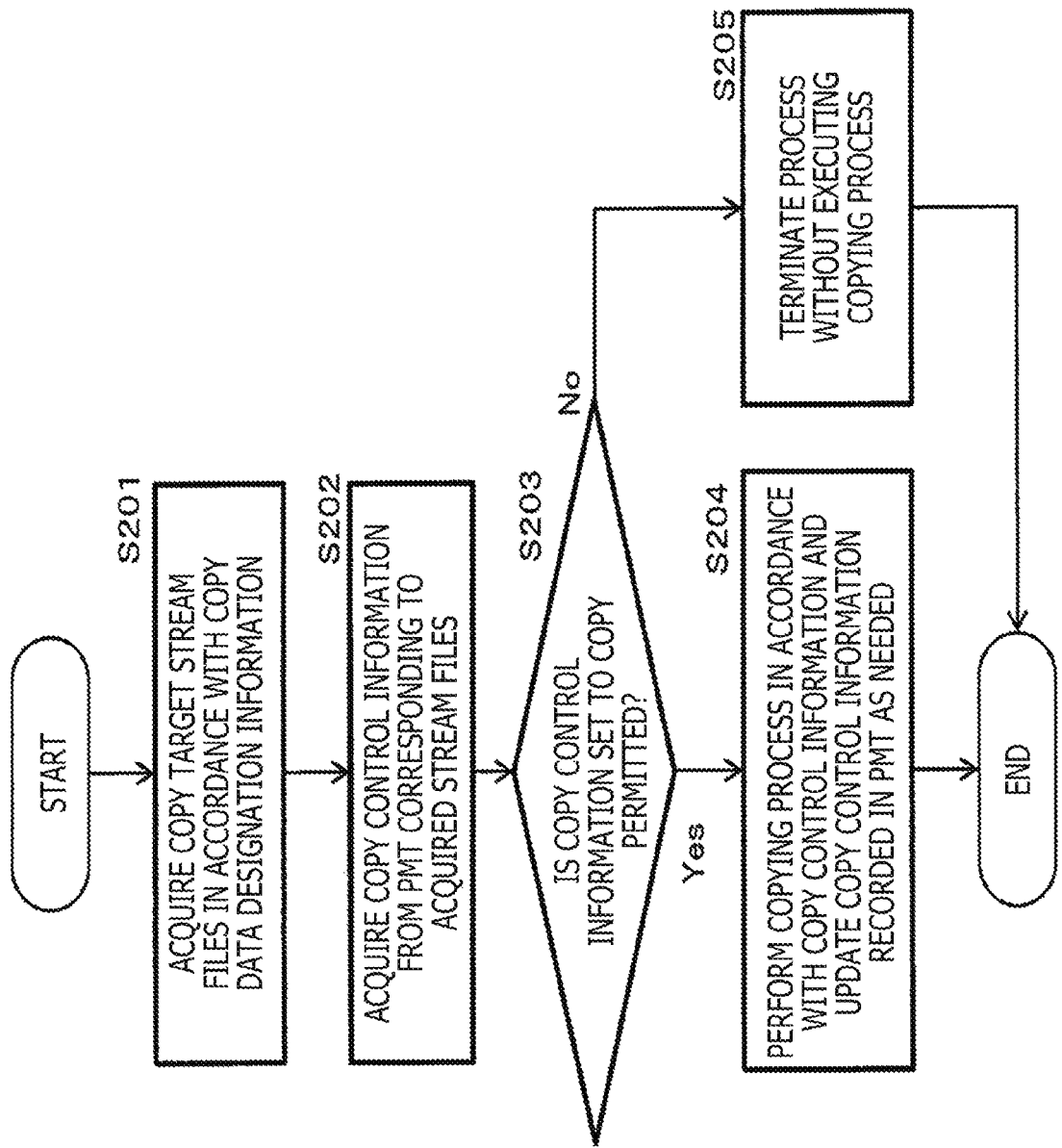
FIG. 27 is a flowchart explaining a process sequence of the process of copying data between information recording medium (medium).

Explained next with reference to the flowchart in FIG. 27 is the sequence of the process performed by the information processing apparatus 500 in FIG. 26 to copy data from the first medium 521 to the second medium 522.

The process that follows the flow outlined in FIG. 27 may be performed, for example, under control of a data processing section (control section) equipped with a CPU capable of program execution in keeping with programs stored in the storage section of the information processing apparatus 500.

Each of the steps making up the flow of FIG. 27 is explained below in sequence.

(Step S201)

First in step S201, the information processing apparatus 500 reads from the first medium 521 copy target data such as copy target stream files designated by user-input copy data designation information as well as the playlist files and clip information files corresponding to the stream files, for example.

(Step S202)

In step S202, the information processing apparatus 500 reads the copy control information from the program map table (PMT) in which the control information corresponding to the acquired stream files is recoded.

In the program map table (PMT), the following data is recorded as the copy control information:

EPN=copy output data encryption necessity information; and

CCI=copy restriction information.

(Step S203)

In step S203, the information processing apparatus 500 determines whether or not copying of the selected stream is permitted on the basis of the retrieved copy control information read.

In the case where the copying is determined to be permitted, step S204 is reached.

In the case where the copying is determined to be not permitted, step S205 is reached.

(Step S204)

If in step S203 the copying of the selected stream is determined to be permitted, the information processing apparatus 500 goes to step S204. In step S204, the information processing apparatus 500 performs the process of copying the selected stream and, if necessary, updates the copy control information in the program map table (PMT).

(Step S205)

If in step S203 the copying of the selected stream is determined to be not permitted, the information processing apparatus 500 goes to step S205. In step S205, the information processing apparatus 500 terminates the processing without carrying out the process of copying the selected stream.

[9. Exemplary Configuration of Information Processing Apparatus]

Explained below with reference to FIG. 28 is an exemplary hardware configuration of an information processing apparatus that can be used to execute the process of recording data onto information recording medium and the process of copying data between information recording medium.

A CPU (Central Processing Unit) 601 functions as a data processing section that performs various processes in accordance with programs stored in a ROM (Read Only Memory) 602 or in a storage section 608. For example, the CPU carries out the processing in accordance with the sequences discussed above in conjunction with the embodiment. A RAM (Random Access Memory) 603 stores the programs and data to be carried out and operated on by the CPU 601. The CPU 601, ROM 602, and RAM 603 are interconnected via a bus 604.

The CPU 601 is connected with an input/output interface 605 via the bus 604. The input/output interface 605 is connected with an input section 606 including switches, a keyboard, a mouse and a microphone, and with an output section 607 including a display device and speakers. The CPU 601 performs various processes in response to commands entered from the input section 606, and outputs the result of the processing to the output section 607, for example.

The storage section 608 connected with the input/output interface 605 includes a hard disc, for example, and stores the programs and data to be carried out and operated on by the CPU 601. A communication section 609 functions as a transmission/reception section that communicates with external apparatuses via networks such as the Internet and local area networks or by use of broadcast waves.

A drive 610 connected with the input/output interface 605 drives removable medium 611 including a magnetic disc, an optical disc, a magneto-optical disc, or a semiconductor memory such as a memory card attached thereto, in order to record or read data to or from the attached medium.

[10. Summary of Configurations of Present Disclosure]

It is to be understood that while the present disclosure has been described in detail in conjunction with specific embodiments, it is evident that alternatives, modifications and variations will become obvious to those skilled in the art within the spirit and scope of this disclosure. That is, the present invention has been disclosed using only examples and should not be construed to be limited thereby but should only be limited by the proper scope or fair meaning of the accompanying claims.

The present disclosure may be implemented preferably in the following configurations.

(1)

An information processing apparatus including:
a data processing section configured to perform format conversion that involves inputting MMT (MPEG Media Transport) format data with copy control information set therein and converting the input MMT format data to MPEG-2 TS format data so as to generate record data for recording onto information recording medium, in which
the data processing section acquires, from within the input data, the copy control information corresponding to the MMT format data, converts the acquired copy control information to copy control information stipulated by the MPEG-2 TS format, and generates the record data including the copy control information stipulated by the MPEG-2 TS format.

(2)

The information processing apparatus according to (1), in which
the data processing section performs a process of acquiring from within the input data the copy control information corresponding to the MMT format data and using the acquired copy control information to generate copy control information for recording to a program map table (PMT) stipulated by the MPEG-2 TS format.

(3)

The information processing apparatus according to (1) or (2), in which
the data processing section generates a TS packet that stores a program map table (PMT) with the copy control information recorded therein and stores the generated TS packet into a clip AV stream file stipulated either by the BDAV format or by the SPAV format.

(4)

The information processing apparatus according to any one of (1) to (3), in which
the data processing section acquires the copy control information corresponding to the MMT format data from a service description table (MH-SDT) stipulated by the MMT format.

(5)

The information processing apparatus according to any one of (2) to (4), in which
the data processing section records
(a) copy output data encryption necessity information, and
(b) at least either copy permission/prohibition information or allowed copy count information,
to the program map table (PMT), regarding the above information with the data for recording onto an information recording medium.

(6)

The information processing apparatus according to any one of (2) to (5), in which
the data processing section performs the process of determining values of EPN and CCI stipulated as the record data in the program map table (PMT).

(7)

The information processing apparatus according to (6), in which
the data processing section performs the process of determining the EPN and CCI values for recording to the program map table (PMT) in accordance with predetermined conversion rules.

(8)

The information processing apparatus according to (7), in which
the conversion rules are rules by which the copy control information recorded in the service description table (MH-SDT) stipulated by the MMT format is converted to the copy control information recorded in the program map table (PMT) stipulated by the MPEG-2 TS format, and vice versa.

(9)

An information processing apparatus including:
a data processing section configured to copy record data from a first medium to a second medium, in which
the first medium records a stream file configured with a packet sequence including a TS packet that stores reproduced data obtained by converting MMT (MPEG Media Transport) format data to MPEG-2 TS format data, and a TS packet that stores copy control information corresponding to the reproduced data, and the data processing section executes copy control on the stream file by referring to and complying with the referred copy control information.

(10)

The information processing apparatus according to (9), in which the copy control information is recorded in a program map table (PMT) stipulated by the MPEG-2 TS format, and the data processing section selects a TS packet that stores the program map table (PMT), acquires the program map table (PMT) from the selected TS packet, and executes copy control on the stream file by referring to and complying with the referred copy control information recorded in the acquired program map table (PMT).

(11)

The information processing apparatus according to (10), in which the data processing section executes copy control in compliance with values of EPN and CCI stipulated as the record data in the program map table (PMT).

(12)

The information processing apparatus according to any one of (9) to (11), in which the copy control information is generated on the basis of the copy control information acquired from a service description table (MH-SDT) stipulated by the MMT format.

(13)

The information processing apparatus according to any one of (9) to (12), in which the data processing section acquires (a) copy output data encryption necessity information, and (b) at least either copy permission/prohibition information or allowed copy count information, on the basis of the copy control information, and the data processing section further executes copy control on the stream file in compliance with the acquired information.

(14)

An information recording medium having a stream file configured with a TS packet sequence including:

a TS packet that stores reproduced data obtained by converting MMT (MPEG Media Transport) format data to MPEG-2 TS format data; and a TS packet that stores copy control information corresponding to the reproduced data, wherein the information recording medium having record data thereon allow an information processing apparatus performing a process of copying the record data onto the information recording medium to execute copy control on the stream file by referring to and complying with the referred copy control information.

(15)

An information processing method for execution by an information processing apparatus that has a data processing section configured to perform format conversion that involves inputting MMT (MPEG Media Transport) format data with copy control information set therein and converting the input MMT format data to MPEG-2 TS format data so as to generate record data for recording onto an information recording medium, the information processing method including the steps of:

causing the data processing section to acquire, from within the input data, the copy control information corresponding to the MMT format data;

to convert the acquired copy control information to copy control information stipulated by the MPEG-2 TS format; and to generate the record data including the copy control information stipulated by the MPEG-2 TS format.

(16)

An information processing method for execution by an information processing apparatus that has a data processing section configured to copy record data from a first medium to a second medium, the first medium recording a stream file configured with a packet sequence including a TS packet that stores reproduced data obtained by converting MMT (MPEG Media Transport) format data to MPEG-2 TS format data, and a TS packet that stores copy control information corresponding to the reproduced data, the information processing method including a step of:

causing the data processing section to execute copy control on the stream file by referring to and complying with the copy control information.

(17)

A program for causing an information processing apparatus to perform information processing, the information processing apparatus having a data processing section configured to perform format conversion that involves inputting MMT (MPEG Media Transport) format data with copy control information set therein and converting the input MMT format data to MPEG-2 TS format data so as to generate record data for recording onto an information recording medium, the program causing the data processing section to perform:

a process of acquiring from within the input data the copy control information corresponding to the MMT format data;

a process of converting the acquired copy control information to copy control information stipulated by the MPEG-2 TS format; and a process of generating the record data including the copy control information stipulated by the MPEG-2 TS format.

(18)

A program for causing an information processing apparatus to perform information processing, the information processing apparatus having a data processing section configured to copy record data from a first medium to a second medium, the first medium recording a stream file configured with a packet sequence including a TS packet that stores reproduced data obtained by converting MMT (MPEG Media Transport) format data to MPEG-2 TS format data, and a TS packet that stores copy control information corresponding to the reproduced data, the program causing the data processing section to execute:

copy control on the stream file by referring to and complying with the copy control information.

The series of the processes described above may be executed by hardware, by software, or by the combination of both. Where the software-based processing is to be carried out, the programs recording the process sequences involved may be installed into an internal memory of a computer in dedicated hardware for program execution. Alternatively, the programs may be in-stalled into a general-purpose computer capable of performing diverse processes for execution of the programs. The programs may be recorded beforehand on recording medium for example. The programs may be installed into the computer from such recording medium or received through networks such as LAN (Local Area Network) or the Internet before being installed onto internal recording medium such as hard discs.

The processes described above may be executed not only chronologically in the depicted sequence but also parallelly or individually as needed or in keeping with the performance of the apparatus doing the execution. In this description, the term "system" refers to an aggregate of logically configured apparatuses. The apparatuses in such a configuration may or may not be housed in a single enclosure.

INDUSTRIAL APPLICABILITY

As described above, one embodiment of the present disclosure has the configuration that converts MMT format data to MPEG-2 TSV format data for recording onto medium, thereby permitting copy control in compliance with the initial copy control information.

Specifically, MMT format data with copy control information set therein is input and converted to MPEG-2 TS format data when recorded onto information recording medium, for example. The copy control information recorded in the service description table (MH-SDT) stipulated by the MMT format is acquired and, in accordance with predetermined conversion rules, used to generate the copy control information to be recorded to the program map table (PMT) stipulated by the MPEG-2 TS. For example, the EPN and CCI values to be recorded to the PMT are determined in accordance with the conversion rules.

The above-described configuration thus provides copy control under which MMT format data is converted to MPEG-2 TSV format data when recorded to medium in compliance with the initial copy control information.

REFERENCE SIGNS LIST

20 Transmission apparatus
21 Broadcasting server
22 Data delivery server
30 Information processing apparatus
31 Recording/reproduction apparatus
32 TV
33 PC
34 Mobile terminal
40 Information recording medium (medium)
41 BD
42 HDD
43 Flash memory
60 HDD
61 Recording/reproduction apparatus
62-66 Medium
400 Information processing apparatus
401 Data input section
402 User input section
403 Control section
404 Storage section
405 Demultiplexer
406 Record data generation section
407 Recording section
408 Drive
411 Subtitle data generation section
412 Video data generation section
413 Audio data generation section
414 Auxiliary information generation section
415 Multiplexer
416 Database file generation section
420 Information recording medium
451 Data analysis section
452 Program map table (PMT) generation section
453 Database file record data generation section
500 Information processing apparatus
501 Control section
502 Input section
503 Communication section
504 Storage section
505 Output section
506 First medium IF
507 Data buffer
508 Copy control information verification section
509 Copy record data generation section
510 Second medium IF
521 First medium
522 Second medium
601 CPU
602 ROM
603 RAM
604 Bus
605 Input/output interface
606 Input section
607 Output section
608 Storage section
609 Communication section
610 Drive
611 Removable medium

The invention claimed is:

1. An information processing apparatus, comprising:
circuitry configured to:
receive MPEG Media Transport (MMT) format data that includes a service description table (MH-SDT);
acquire, from the MH-SDT, copy control information stipulated by an MMT format;
acquire, from the MH-SDT, a setting of encryption mode information of the copy control information stipulated by the MMT format and a setting of digital recording control information of the copy control information stipulated by the MMT format;
determine a value of copy output data encryption necessity information (EPN) based on the acquired setting of the encryption mode information of the copy control information stipulated by the MMT format, wherein the EPN is stipulated by an MPEG-2 TS format; and
determine a value of Copy Restriction information (CCI) based on the acquired setting of the digital recording control information of the copy control information stipulated by the MMT format, wherein the CCI is stipulated by the MPEG-2 TS format;
convert the acquired copy control information to copy control information stipulated by the MPEG-2 TS format based on the determined value of the EPN and the determined value of the CCI;
generate record data that includes the copy control information stipulated by the MPEG-2 TS format; and
control an information recording medium to record the generated record data.

2. The information processing apparatus according to claim 1, wherein the circuitry is further configured to generate, based on the acquired copy control information, the copy control information stipulated by the MPEG-2 TS format to record the generated copy control information to a program map table (PMT).

3. The information processing apparatus according to claim 2, wherein the circuitry is further configured to:
record, in the PMT, AV stream data, the copy output data encryption necessity information, and at least one of copy permission/prohibition information or allowed copy count information; and control the information recording medium to record the AV stream data, the copy output data encryption necessity information, and at least one of the copy permission/prohibition information or the allowed copy count information.

4. The information processing apparatus according to claim 2, wherein each of the value of the EPN and the value of the CCI is stipulated as the record data in the PMT.

5. The information processing apparatus according to claim 4, wherein the circuitry is further configured to determine each of the value of the EPN and the value of the CCI based on specific conversion rules.

6. The information processing apparatus according to claim 5, wherein based on the specific conversion rules, the circuitry is further configured to convert:

the copy control information recorded in the MH-SDT stipulated by the MMT format to the copy control information recorded in the PMT stipulated by the MPEG-2 TS format, and the copy control information stipulated by the MMT format to the copy control information stipulated by the MPEG-2 TS format.

7. The information processing apparatus according to claim 1, wherein the circuitry is further configured to:

generate a TS packet that stores a program map table (PMT), wherein the program map table (PMT) includes the copy control information stipulated by the MPEG-2 TS format; and store the generated TS packet into a clip AV stream file stipulated by one of a BDAV format or a SPAV format.

8. An information processing method, comprising:

in an information processing apparatus:

receiving MPEG Media Transport(MMT) format data that includes a service destination table (MH-SDT);

acquiring, from the MH-SDT, copy control information stipulated by an MMT format;

acquiring, from the MH-SDT, a setting of encryption mode information of the copy control information stipulated by the MMT format and a setting of digital recording control information of the copy control information stipulated by the MMT format;

determining a value of copy output data encryption necessity information (EPN) based on the acquired setting of the encryption mode information of the copy control information stipulated by the MMT format, wherein the EPN is stipulated by an MPEG-2 TS format; and determining a value of Copy Restriction information (CCI) based on the acquired setting of the digital recording control information of the copy control information stipulated by the MMT format, wherein the CCI is stipulated by the MPEG-2 TS format;

converting the acquired copy control information to copy control information stipulated by the MPEG-2 TS format based on the determined value of the EPN and the determined value of the CCI;

generating record data that includes the copy control information stipulated by the MPEG-2 TS format; and controlling an information recording medium to record the generated record data.

9. A non-transitory computer-readable medium having stored thereon computer executable instructions, which when executed by an information processing apparatus, cause the information processing apparatus to execute operations, the operations comprising:

receiving MPEG Media Transport(MMT) format data that includes a service description table (MH-SDT);

acquiring, form the MH-SDT, copy control information stipulated by an MMT format;

acquiring, from the MH-SDT, a setting of encryption mode information of the copy control information stipulated by the MMT format and a setting of digital recording control information of the copy control information stipulated by the MMT format;

determining a value of copy output data encryption necessity information (EPN) based on the acquired setting of the encryption mode information of the copy control information stipulated by the MMT format, wherein the EPN is stipulated by an MPEG-2 TS format; and determining a value of Copy Restriction information (CCI) based on the acquired setting of the digital recording control information of the copy control information stipulated by the MMT format, wherein the CCI is stipulated by the MPEG-2 TS format;

converting the acquired copy control information to copy control information stipulated by the MPEG-2 TS format based on the determined value of the EPN and the determined value of the CCI;

generating record data that includes the copy control information stipulated by the MPEG-2 TS format; and controlling an information recording medium to record the generated record data.

* * * * *